United States Patent [19]
Ricken et al.

[11] Patent Number: 5,447,177
[45] Date of Patent: Sep. 5, 1995

[54] SEPARATING DEVICE FOR CONDUITS

[75] Inventors: Norbert Ricken, Bochum; Wolfgang Kaul, Wuppertal, both of Germany

[73] Assignee: Carl Kurt Walther GmbH & Co. KG, Wuppertal, Germany

[21] Appl. No.: 217,934

[22] Filed: Mar. 25, 1994

[30] Foreign Application Priority Data

Oct. 18, 1993 [DE] Germany .................. 43 35 427.0

[51] Int. Cl.6 ............................................. F16L 37/28
[52] U.S. Cl. ............................ 137/614.04; 137/614.02
[58] Field of Search ..................... 137/614.04, 614.02

[56] References Cited

U.S. PATENT DOCUMENTS

| | | | |
|---|---|---|---|
| 879,880 | 2/1908 | Landau | 137/614.04 |
| 2,505,093 | 4/1950 | Brock | 137/614.04 |
| 2,661,967 | 12/1953 | Mitchell | 137/614.04 |
| 2,727,759 | 12/1955 | Elliott | 137/614.04 |
| 3,664,375 | 5/1972 | Marette | 137/614.04 |
| 4,074,698 | 2/1978 | Hobson et al. | 137/614.04 |
| 4,222,411 | 9/1980 | Herzan et al. | 137/614.04 |
| 4,832,080 | 5/1989 | Smith, III | 137/614.04 |
| 5,099,882 | 3/1992 | Smith, III | 137/614.04 |

FOREIGN PATENT DOCUMENTS

| | | | |
|---|---|---|---|
| 0472652 | 3/1992 | European Pat. Off. . | |
| 479832 | 7/1929 | Germany | 137/614.04 |
| 2852617 | 6/1980 | Germany . | |
| 3901652 | 7/1989 | Germany . | |

Primary Examiner—A. Michael Chambers
Attorney, Agent, or Firm—Martin A. Farber

[57] ABSTRACT

A connecting coupling (K) or separating device for conduits or for detachable conduit connection of, in particular, pressure-conducting fluid conduits (I, II), having a first coupling part (I) and a second coupling part (II), a closed fluid flow path being present in coupled state, in which connection further radial conduit sections of a coupling connection conduit and of a coupling part have mouth cross sections which can be brought into coincidence and, in the course of the coupling process, a coupling closure in each coupling part (I, II) can be opened and the mouth cross sections both of the coupling connection conduit and of the radial conduit section of the coupling part can be closed by displacement, the displacement at the same time bringing about the valve closure of the first and second coupling parts (I, II). In order to achieve a compression-free coupling with the least possible leakage or possibility of leakage, a closure part (V) which performs the slide function forms a conduit section (11) of the fluid flow path and, in the course of the displacement, the conduit section (I) can be isolated, with enclosure of the part of the fluid present therein.

24 Claims, 18 Drawing Sheets

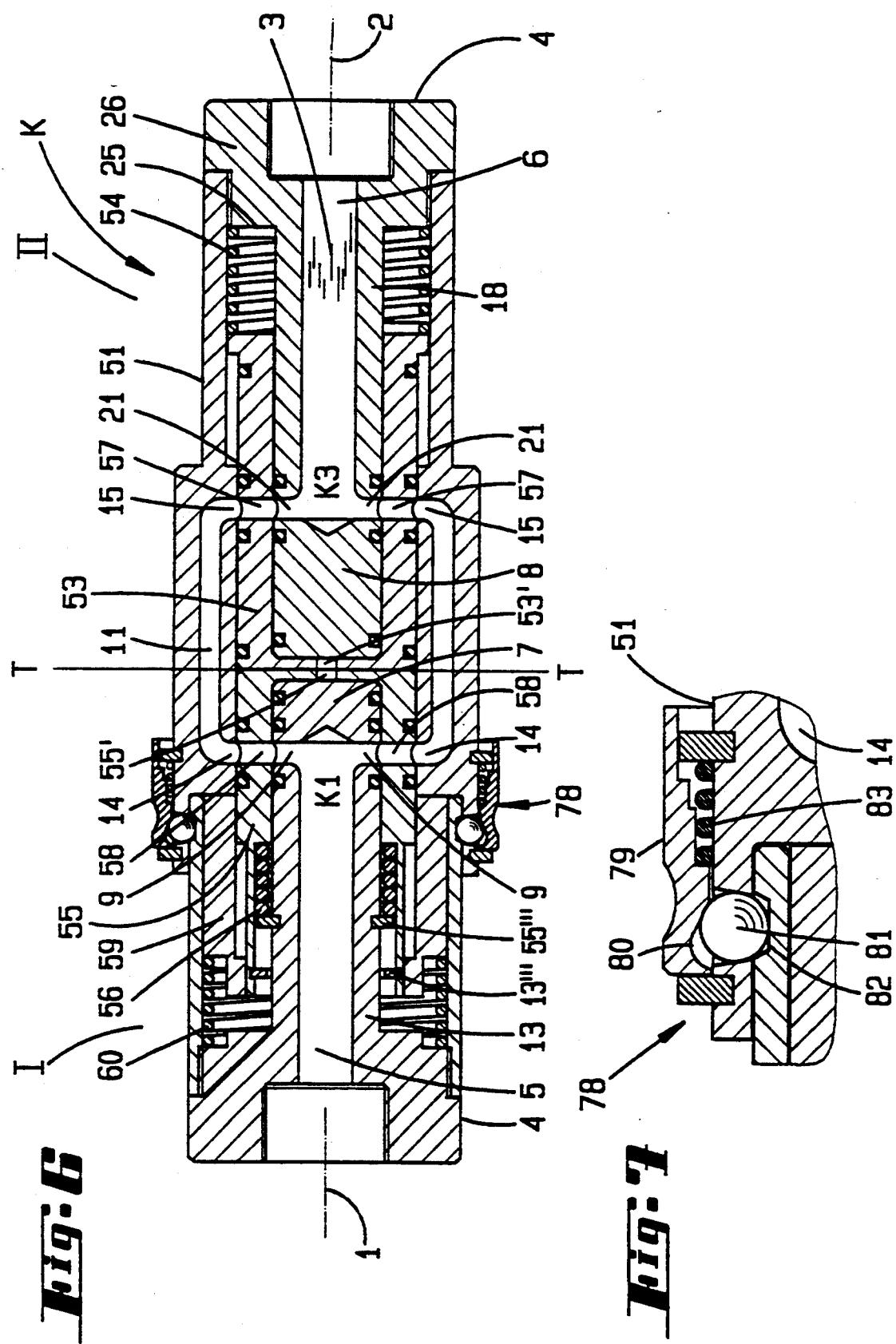

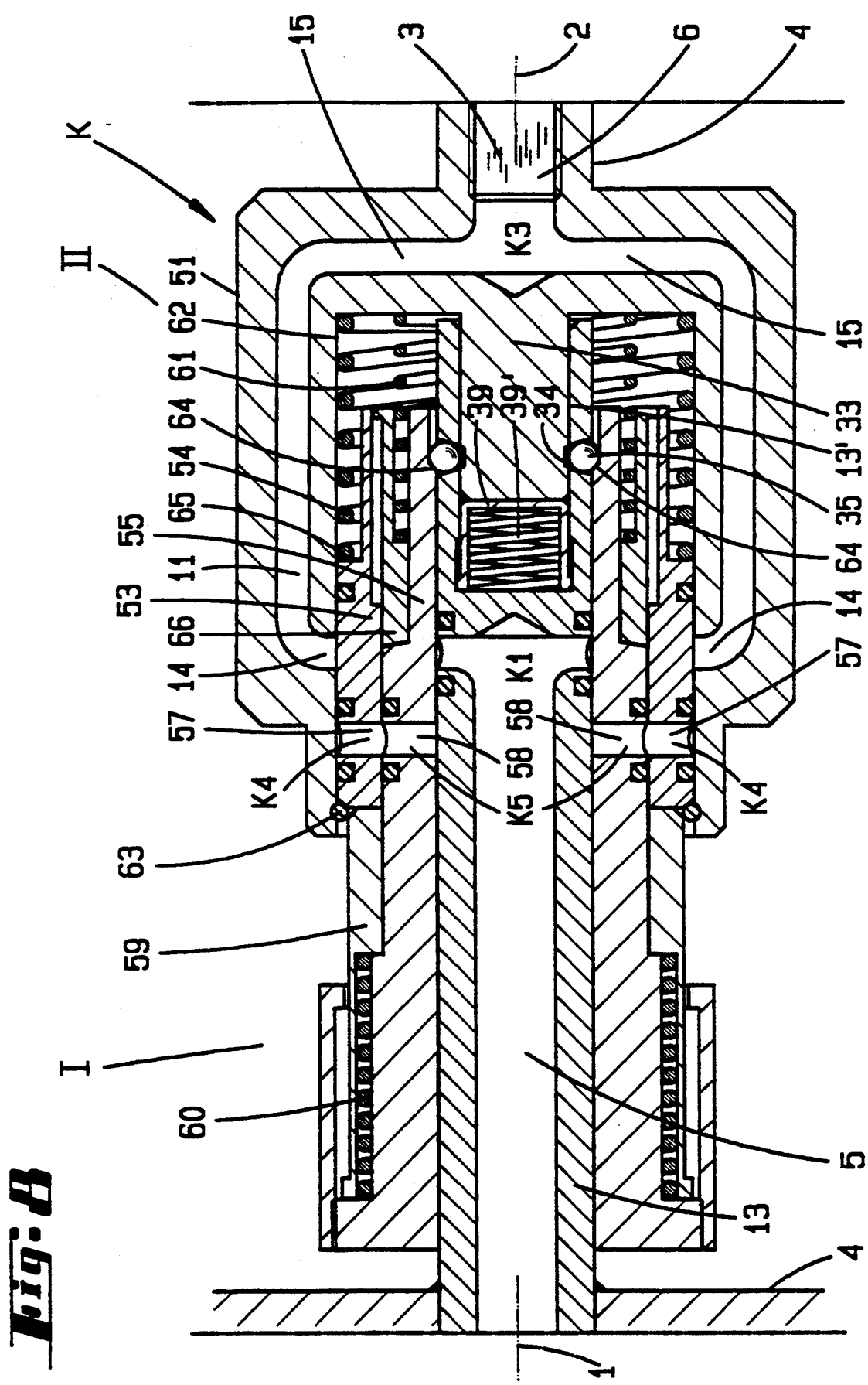

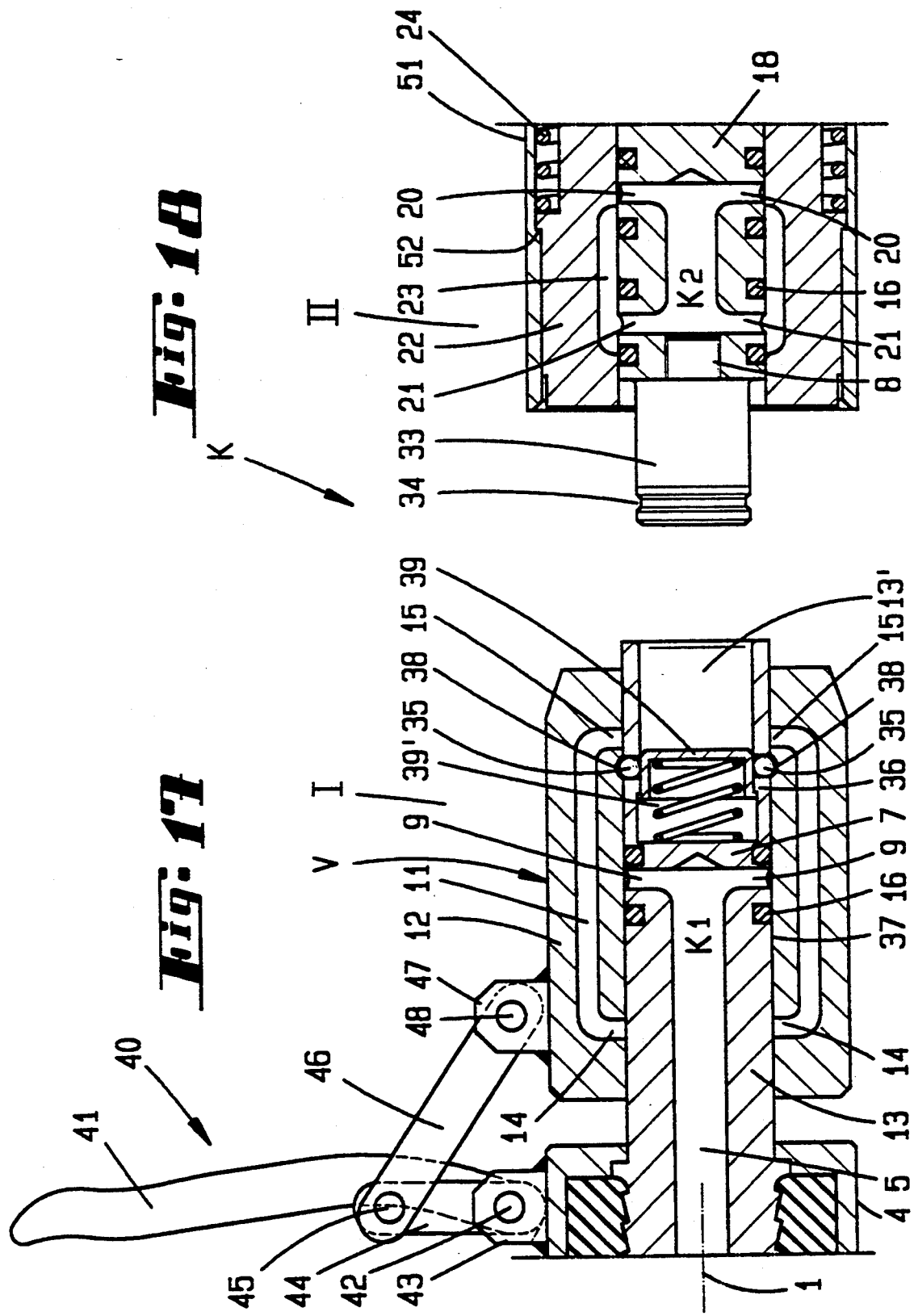

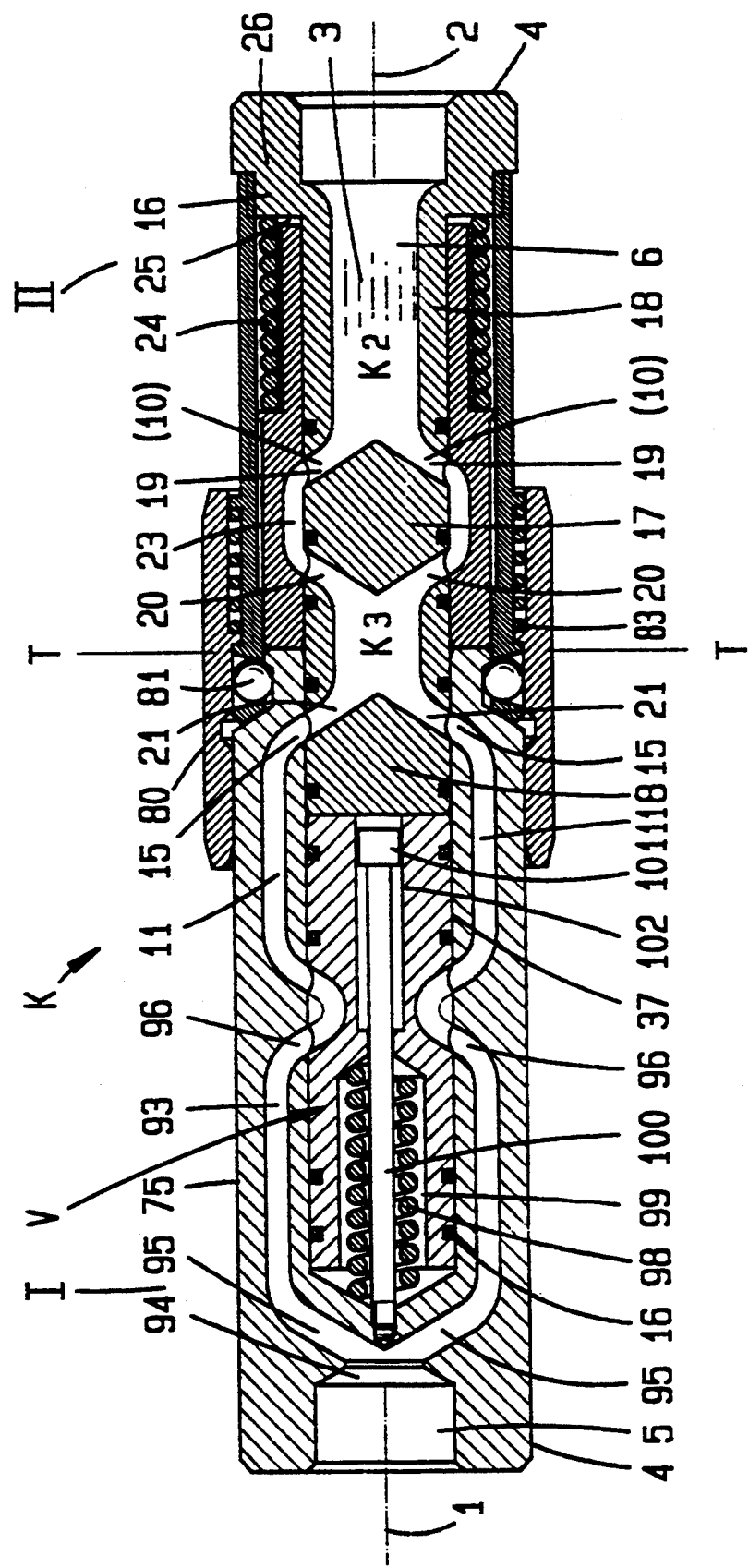

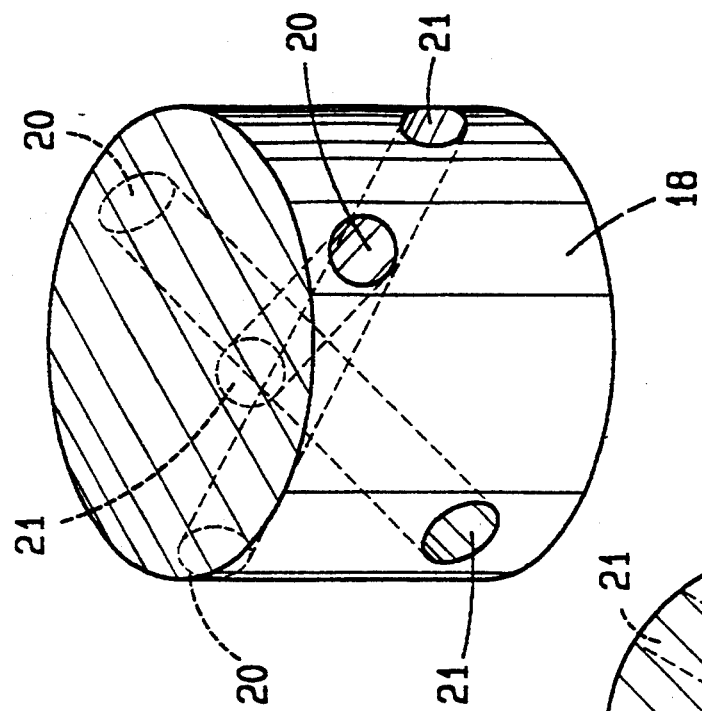
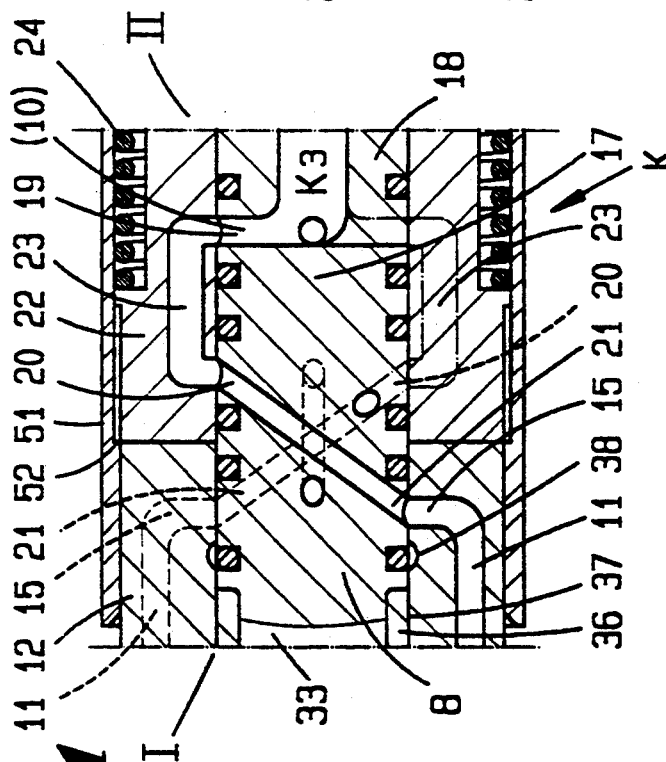
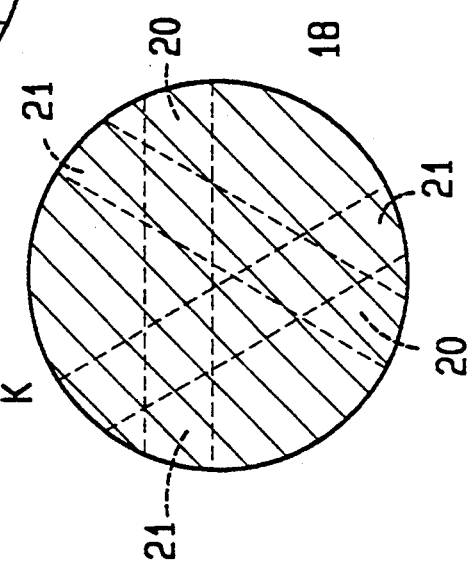

SEPARATING DEVICE FOR CONDUITS

FIELD AND BACKGROUND OF INVENTION

The present invention relates to a connection coupling or separating device for conduits or for detachable conduit connection for, in particular, pressure-conducting fluid conduits having first and second coupling parts, in which a closed fluid flow path is present in coupled state, furthermore radial conduit sections of a coupling connection conduit and of a coupling part have mouth cross sections which can be brought into coincidence and, in the course of the coupling process, a valve closure in each coupling part can be opened and the mouth cross sections of both the coupling connection conduit and the radial conduit section of the coupling part can be closed by displacement, which displacement at the same time brings about the valve closure of the first and second coupling parts.

Such separating devices or couplings with radial passage therein of the fluid from one coupling part into the other require only a slight coupling force despite the fact that the fluid is under pressure. Therefore, only the sealing friction and possibly the restoring force of, for instance, spring-loaded closure valves need be overcome.

Couplings of this kind are known, for instance, from Federal Republic of Germany Patent 28 52 617 and OS 39 01 652. Both prior publications are, however, problematic with respect to leakage losses. The coupling in accordance with Federal Republic of Germany OS 39 01 652 leaves the conduit sections of both coupling parts open after emergence of the one coupling part, so that the portion of fluid present therein which is closed off by valve from the corresponding fluid conduit can escape unimpeded. The coupling in accordance with Federal Republic of Germany Patent 28 52 617 is so constructed that the radial conduit sections of the coupling parts are, to be sure, pushed away; upon the coupling or uncoupling, however, the mouth cross sections of the connection conduit come into the region of the transverse joint so that a loss can occur here.

Other known couplings of this type have the disadvantage that the reduced volume, occurring upon the coupling, between nipple which acts as a piston and bore which acts as cylinder is forced into the fluid flow path. This means an increase of pressure in the system, particularly in the case of hydraulic fluids.

SUMMARY OF THE INVENTION

The object of the present invention is to create a coupling of this type which effects a compression-free coupling with the slightest possible leakage or possibility of leakage; it is essential in this connection that this coupling requires at all times the same detachment forces regardless of the fluid pressure. This simplifies the required control mechanisms for the separating of the conduit connection, for instance in the event of damage.

Accordingly the invention provides a coupling of this type with which, while retaining a small coupling force, no increase in pressure occurs in the fluid upon the coupling, the escape of fluid is practically completely reduced, and also no entry of air or liquid into the supply system is, for instance, possible. The coupling can be effected under full operating pressure. The limiting of the separating forces is independent of the state of pressure. The principle of solution found is thus important, in particular, on loading arms of safety conduit connections. This is achieved in the manner that a closure part which performs the slide function forms a section of the conduit of the fluid flow path and that it can be isolated in the course of the displacement of the conduit section, enclosing the portion of fluid present therein. This leaves the flow path uniform. For example, no air bubbles can enter. The separating of a portion by displacement takes place with complete sealing off of the relatively displaced portions of fluid from the fluid flow path. Of course, in this connection suitable seals are inserted, whether with reference to a more frequent actuation of the coupling or a long-term sealing. This displacement of a fluid bridge in the manner of a switch not only provides the advantage of fixed piping on both sides of the coupling but also avoids the above-mentioned compressing of the fluid. Rather, a constant state of pressure can be obtained. It is furthermore proposed that the coupling connection conduit extend in the coupling radially outward to the fluid conduits of the coupling parts. Such fluid conduits, as a general rule, assume a coaxial position with respect to each other. The conduit section as part of the coupling connection conduit thus extends displaced substantially parallel in space to the axis of the conduit. Several such coupling connection conduits can be provided as fluid bridges. Furthermore, the invention proposes that two chambers which are closed off from each other in uncoupled state be formed in the second coupling part, one chamber representing the end region of the fluid conduit and the other chamber forming a part of the fluid flow path in coupled state. This represents a particularly favorable low-leakage solution. From a structural standpoint, it is then advantageous for the closure part to be a box which, for the coupling, can be displaced over the parting plane between the two coupling parts, the conduit section bridging or gripping over the parting plane in coupled state. In this connection, note is taken of a movement stroke which has the result that, in coupled state, the conduit section connects the first chamber of the one coupling part with the second chamber of the other coupling part. Also with respect to the second coupling part, measures are taken which permit the desired dependable, i.e. practically leakage-free, displacement also here. For this purpose, a slide sleeve is provided which has a conduit section for the connecting of the first and second chambers of the same coupling part. Here also there is present the above-described effect of the separating off of a partial volume, i.e. a part of the fluid, it representing, in addition to the desired sealing, a fluid bridge which can continuously be disengaged or engaged. Accordingly, coupling parts which are even practically of the same shape can be used, since the slide sleeve fulfills a function which is adequate for the box. For the securing and release of the operating position, it is then proposed by the invention that the box be adapted to be locked axially on the fluid conduit by radial engagement. The locking means are preferably developed with an eye to one-hand operation. An embodiment which is particularly advantageous in operation and favorable from the standpoint of force results from the fact that the box is connected by a toggle joint to an abutment which is fixed axially on the fluid line. Since relatively small forces, i.e. forces merely opposing the sealing friction and possible return springs of valve closures, are to be overcome, it is sufficient for the toggle joint to be actuated by hand lever.

Even a structurally simple self-locking can be used here, the toggle joint being movable into a safety position which is beyond dead center. It is furthermore proposed that a hammerhead be developed as plug on the end surface of the one coupling part for keylike engagement in a cavity in the end surface of the other coupling part. It is therefore sufficient merely to place the two coupling parts radially together and then effect the coupling stroke. The coupling parts which are positioned thereby already assume their final position with respect to each other. Furthermore, the invention proposes that end surfaces of box and/or slide sleeve of second coupling parts which lie against each other in the coupled state form, starting from a position directly against each other, an outwardly opening wedge-shaped space. Such a solution, which is further simplified structurally, can be used if slight leakages can be tolerated and there is thus concerned, for instance, a fluid which is environmentally unobjectionable. By the said development, the two coupling parts are pulled together as a result of a so-called Venturi effect. There is even obtained an action in the sense of an intensifying of the seal. This can be increased by a means least mentioned. Furthermore, there is also proposed a solution which consists therein that, for the pushing-away of the conduit sections two slide sleeves are provided which are displaceable with respect to each other and with respect to the conduit sections. These slide sleeves are coaxial. On the other hand, it is also advantageous for the slide sleeves to be arranged concentrically in an annular shank between the first and second coupling parts. This results in a particularly short structural shape of such couplings. It is furthermore proposed that, in the uncoupled state of the conduit sections, an isolated volume (portion of fluid) be present in each slide sleeve. Another favorable structural form also consists of an end-surface seal between the coupling parts. On an embodiment of this type, in which furthermore a slide sleeve is sealed against a coupling part by elements of U-shaped cross section, it is advantageous for two such sealing elements to be installed in a row with their U-openings facing each other. In this case, when travelled over by the radial conduit section, an increase in the sealing application of such elements can be obtained as a result of the fluid pressure. In this connection, it is advantageous for the two sealing elements to be spaced from each other by an intermediate piece which can be flowed around. This flow permits the widening of the U-arms in the sense of an increased seal in both directions. With respect to the embodiment with toggle joint, there has been found advantageous an embodiment such that when the toggle lever between box and coupling shank is bent a spherical detent has entered into action. Thus, only when the other coupling part is associated is there the possibility of displacing the box by means of the toggle. Furthermore, it is advantageous that with the arrangement on the inside of a movable closure part, two flow paths lying in the stationary housing wall are provided. The pushing-away is effected accordingly from the inside. An advantageous further development consists therein that one of the outer bypass paths contains a separated volume in the uncoupled state while the other outer bypass path is in communication with the fluid. It is furthermore proposed that the bypass paths of the first and second coupling parts be connected by at least two conduits which cross each other but are not in flow communication with each other. Such conduits can be produced by drilling, obtaining a flow guidance which is free of bend in the course of the bore itself. It can be drilled through continuously. Finally, it is also advantageous for circumferential grooves to be developed on the coupling shank in the region of the mouth of the conduit. This leads to a flow communication of all conduit inlets and to a flow communication of all conduit outlets on, in each case, a common transverse plane. In this way, it is possible to do without an anti-turn device such as would be necessary if the said inlets and outlets required congruent connections to the bypass paths.

BRIEF DESCRIPTION OF THE DRAWINGS

With the above and other and other advantages in view, the present invention will become more clearly understood in connection with the detailed description of preferred embodiments, when considered with the accompanying drawings of which:

FIG. 6 shows this coupling with flow path released, again with a locking device, with slide sleeves oriented coaxially;

FIG. 7 is an enlarged view of the locking device;

FIG. 8 shows the coupling in accordance with a fourth embodiment, seen in closed position;

FIG. 17 shows the coupling part I of the separated coupling in accordance with FIG. 15, with the spherical detent having entered into action;

FIG. 18 shows, in part, the corresponding coupling part II, also shown isolated;

FIG. 20 shows this coupling in coupling position with flow path released;

FIG. 21 shows the central portion of the coupling shown in FIG. 1 with a modification of the manner of development of the conduit sections (conduits 20/21);

FIG. 22 shows, in perspective, the portion of this coupling shank having these conduit sections (conduits); and FIG. 23 is a top view of this portion showing the intersection of the conduits.

DETAILED DESCRIPTION OF THE PREFERRED EMBODIMENTS

Figure 1:
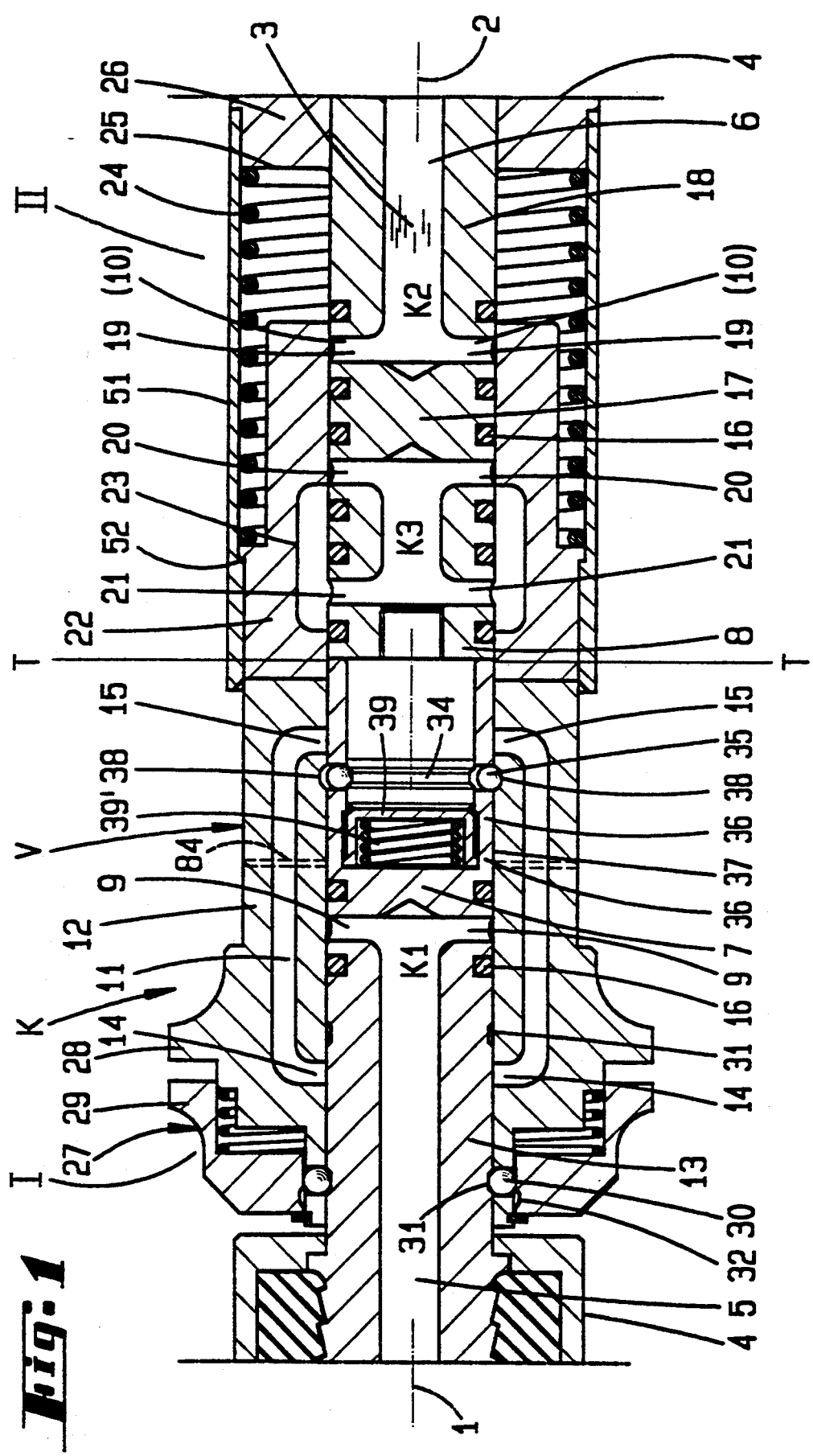
FIG. 1 shows the coupling of the invention in accordance with a first embodiment, shown in closed position.

The coupling K of all embodiments shown in the drawing comprises two coupling parts I, II. The latter serve for connecting fluid conduits 1, 2 which conduct a fluid. The fluid 3 may be of liquid or gaseous nature. It is preferably under pump pressure or self-expanding pressure.

The coaxially extending fluid conduits 1, 2 can be developed as pipeline and/or hose line. The corresponding two connectors bear the reference numeral 4.

The coupling parts I, II can be completely separated or can, as is predominantly the case and shown in the drawing, remain in a secured plug attachment, maintaining a position of readiness for coupling. The position which blocks the flow path is in all cases referred to as the closed position (for instance FIG. 1), and the other position as the open position (see, for instance, FIG. 2).

Opening and closing are based on a relative movement of coupling fitting parts or a displacement. The latter effects at the same the desired sealing valve closure of the coupling parts I, II and the opening.

The pushed-off ends, directed towards each other, of central flow channels 5, 6 of the coupling parts I, II are in each case closed transversely by a wall 7, 8 and pass into a radially outwardly open conduit section 9 and 10 respectively (FIG. 1). The end surfaces of said walls 7, 8 which are directed towards each other define a common parting plane T—T of the coupling K.

The parting plane T—T is bridged over for flow by a movable conduit section 11. The conduit section extends off-center and several of them are provided, preferably arranged with rotary symmetry equal angle apart. Said conduit section 11 is located on a closure part V, developed for instance as an axially displaceable box 12. It slides on the cylindrical outer wall of a coupling shank 13 of the coupling part I, i.e. of the fluid conduit.

The conduit section 11 which is directed on the outside parallel in space to the flow channels 5, 6 continues at both ends also in radially inwardly directed conduit sections 14, 15. These conduit sections 14, 15 are spaced axially from each other by an amount which corresponds essentially to the axial distance between the radial conduit sections 9 and 10 when the said end surfaces rest against each other. It results from this that the closure part V which produces the slide function, i.e. the box 12, by its conduit section 11, together with the said conduit sections 9, 10 and 14, 15 respectively, creates a fluid flow path which, in the course of the displacement of the conduit section 11 into the closed position encloses a portion of fluid of the fluid present therein. If the mouth cross sections of said conduit sections are therefore staggered, the closed position is present if the mouth cross sections are in approximately congruent position to each other, the open position is accordingly present. The box 12 is adapted to be limited by stops. Sealing rings, designated 16, are present on the side of the conduit sections which cooperate in forming the fluid flow path. Such rings 16 can be located either in the coupling shank 13 or else in the box 12.

The inside cross section of the coupling connection conduit in the box 12 which is thus created corresponds to a part of the cross section of the central flow channel 5. A corresponding number of conduit sections are present so as to arrive at the inside cross section of the flow channels 5 and 6. Arranging such coupling connection conduits radially to the outside of the coupling shank 13 leaves the relatively small cross section of the cylindrical coupling shank 13 free for other special fitting parts of the coupling K.

While the coupling part I forms a chamber K1 in front of its wall 7, the other coupling part II, in accordance with a further development, contains two chambers. For this purpose, there is also taken into account a partition wall 17 on the coupling shank 18 there. The first chamber, which faces the flow channel 6, is designated K2 and the second chamber, which lies on the other side of the partition 17, is designated K3.

In the said further development shown in the drawing, the chambers K2 and K3 pass into radially directed conduit sections 19, 20 and 21, in which connection 19 corresponds to the conduit section 10 mentioned with respect to the simplified solution. From the chamber K3, two conduit sections 20, 21 extend, spaced axially from each other. All conduit sections terminate as mouth cross sections on the outer wall of the coupling shank 18 which is cylindrical in this case also.

Figure 2:
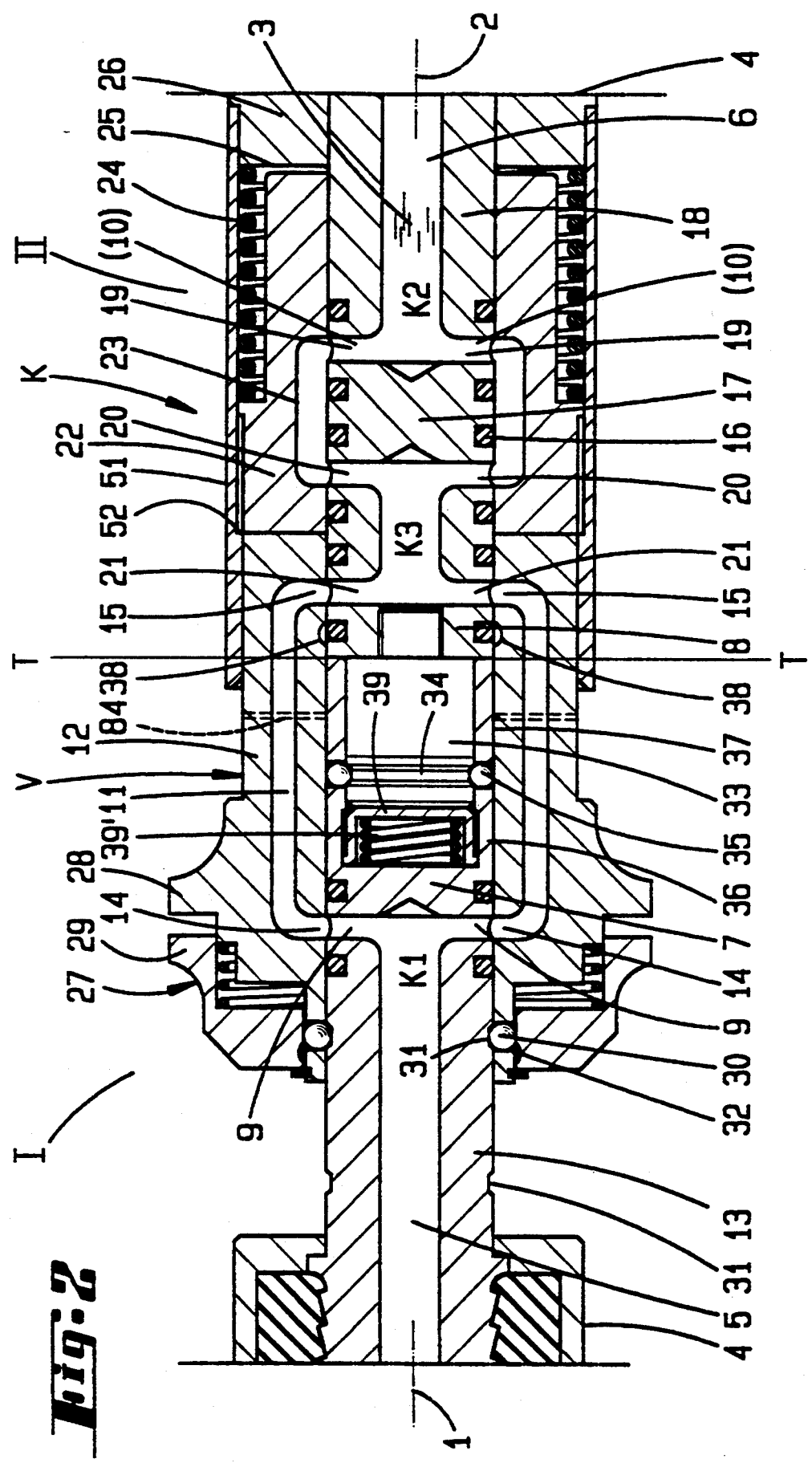
FIG. 2 shows this coupling with flow path released, showing at the same time a ring-locking device, with detent coupling.

The chambers K2, K3, the first of which (K2) faces the end region of the fluid conduit 2 present there and is practically co-formed by the flow channel 6, are valve-closed in uncoupled state by displacement, the other, second chamber K3 of this coupling part II forming, in coupled state, a part of the fluid flow path (see FIG. 2).

Sealing rings 16 on both sides of the plane of the conduit sections 19 to 21 provide the desired action against losses of fluid also on this side of the coupling K. They are provided at least for sealing off from the outside.

In the open position (seer for instance, FIG. 2), the mouth cross section of the conduit sections 15 of the box 12 extends beyond the parting plane T—T between the two coupling parts I, II so that the conduit section 11 which represents the flow bridge clearly extends beyond said parting plane in coupled state. In this connection, the first chamber K1 of the one coupling part 1 is placed in flow communication with the second chamber K3 of the other coupling part II.

Upon this displacement stroke, a valve closure which controls the conduit sections 19, 20, i.e. pushes them off, is actuated, it consisting of a slide sleeve 22 which is displaceable against spring load on the cylindrical outer wall of the coupling shank 18 there. This sleeve constitutes a structural part which is adequate for the closure part V. It namely also has an axially oriented conduit section 23. This conduit section 23, which is comparable to the conduit section 11, serves for connecting the first and second chambers K2, K3 of the coupling part II together in coupled state, .i.e. in the open position having a closed fluid flow path.

The compression spring which displaces slide sleeve 22 in the direction towards the basic position, i.e.

blocked position, bears the reference numeral 24. It rests against a shoulder 25 on a housing section 26 of the coupling half II. The basic position is defined by stop. The parts 18 and 26 can be a single part.

An annular locking device 27 is associated with the box 12 which displaces the slide sleeve 22. The locking device can be locked axially by radial engagement on the fluid conduit, i.e. on the coupling shank 13. The box 22 continues into a holding ring 28 of widening cross section. Adjacent to it, there is a slide ring 29 provided with axial play which is spring-urged into the basic position, said ring resting radially against blocking balls 30 or leaving them free from a detent groove 31 on the outer surface of the coupling shank 13. Two axially spaced detent groove 31 are provided. One is used in the closed position and the other in the open position. The evasion space for the blocking balls on the slide-ring side is designated 32. The entire arrangement can be conveniently actuated with one hand.

The coupling parts I, II can be locked to each other. For this purpose, a central detent pin 33 extends from the coupling shank 18. Near its front end the said pin forms a detent groove 34 on the outer wall side, which groove cooperates with blocking balls 35, which cooperates in a sleeve-like cage 36 of a corresponding extension of the coupling shank 13 (sic). The receiving bore for the detent pin 33 which is thus created bears the reference numeral 13'. An escape space 58 in the wall of a receiving bore 37 for the coupling shank 18 permits the complete separation of this detent connection. On the bottom of the bore 37 there is an ejector 39 under spring load which is acted on by a compression spring 39'. With the detent pin 33 extended, it pushes the blocking balls 35 away in the escape space 38. The shifting off is thus positively secured. Only after the correct entrance of the detent pin 33, pushing back the ejector, can the annular locking device 27 be actuated.

Figure 3:
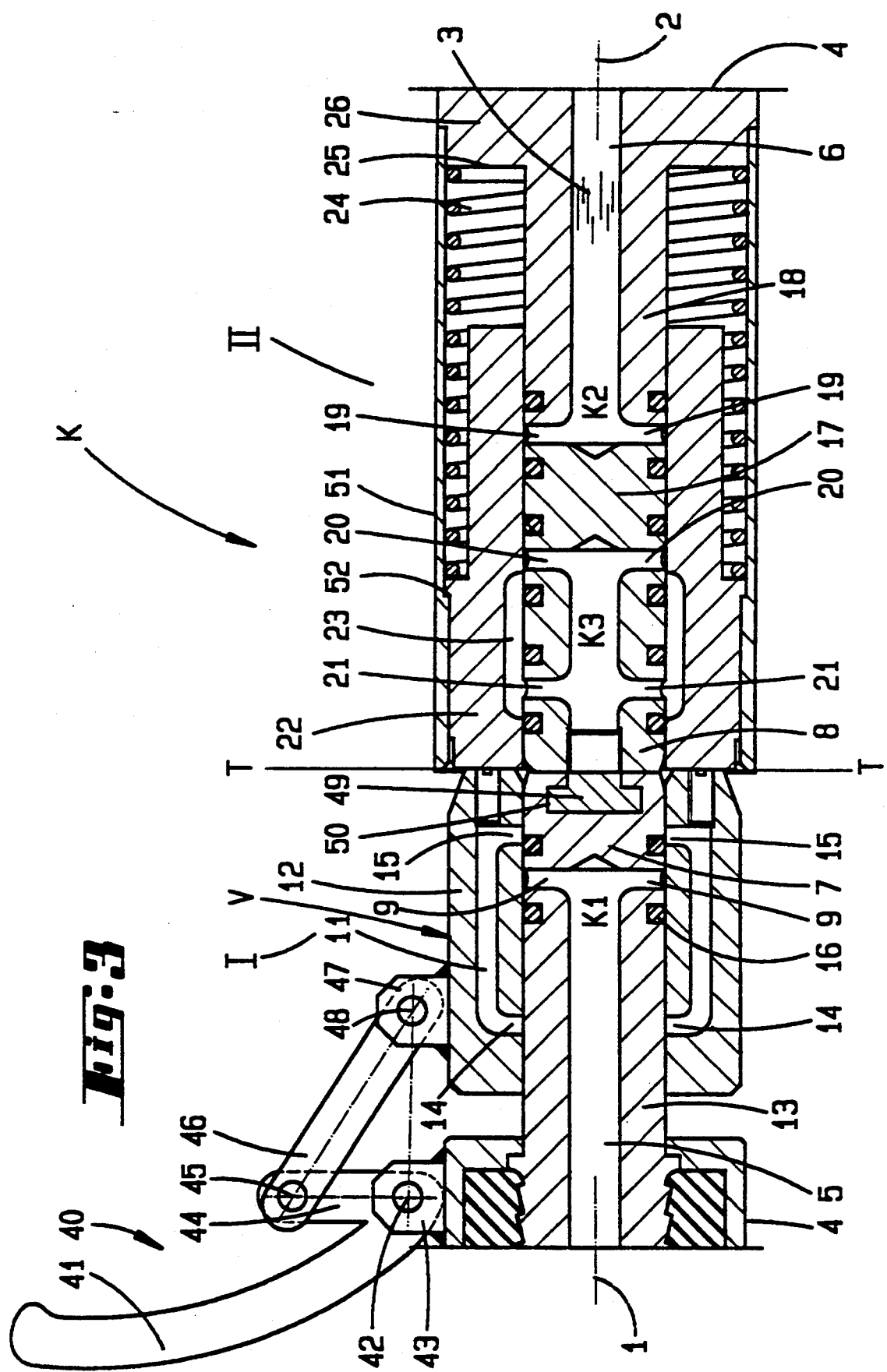
FIG. 3 shows the coupling in accordance with a second embodiment, in closed position.

The coupling K in accordance with the second embodiment (FIGS. 3 and 4) is, in principle, of the same construction. The reference numerals have been applied accordingly, in part without repetitions in the text. The annular locking device 27 which has been described is replaced here by a toggle-joint locking device 40. The latter can be operated by hand lever. The lever is designated 41. It is seated, mounted for swinging in the vertical plane, on a pivot pin 42 of the connector 4 or coupling shank 13. This is a stationary zone which serves as abutment. The bearing lug 43 is located on the top side of the connector. From the pivot point of the hand lever 41, a swing arm 44 which is rigidly connected with it extends. Said arm engages via a pivot point 45 on a pull strap 46 which, in its turn, is pivotally connected via a bearing lug 47 to the movable closure part V, i.e. to the box 12. The pivot pin there is designated 48. By means of the toggle-joint locking device 40, the box 12 can be moved on the coupling shank 13 from the closed position of the coupling K shown in FIG. 3 into the open position shown in FIG. 4. The path which permits the flow of the fluid is thereby produced.

Figure 4:
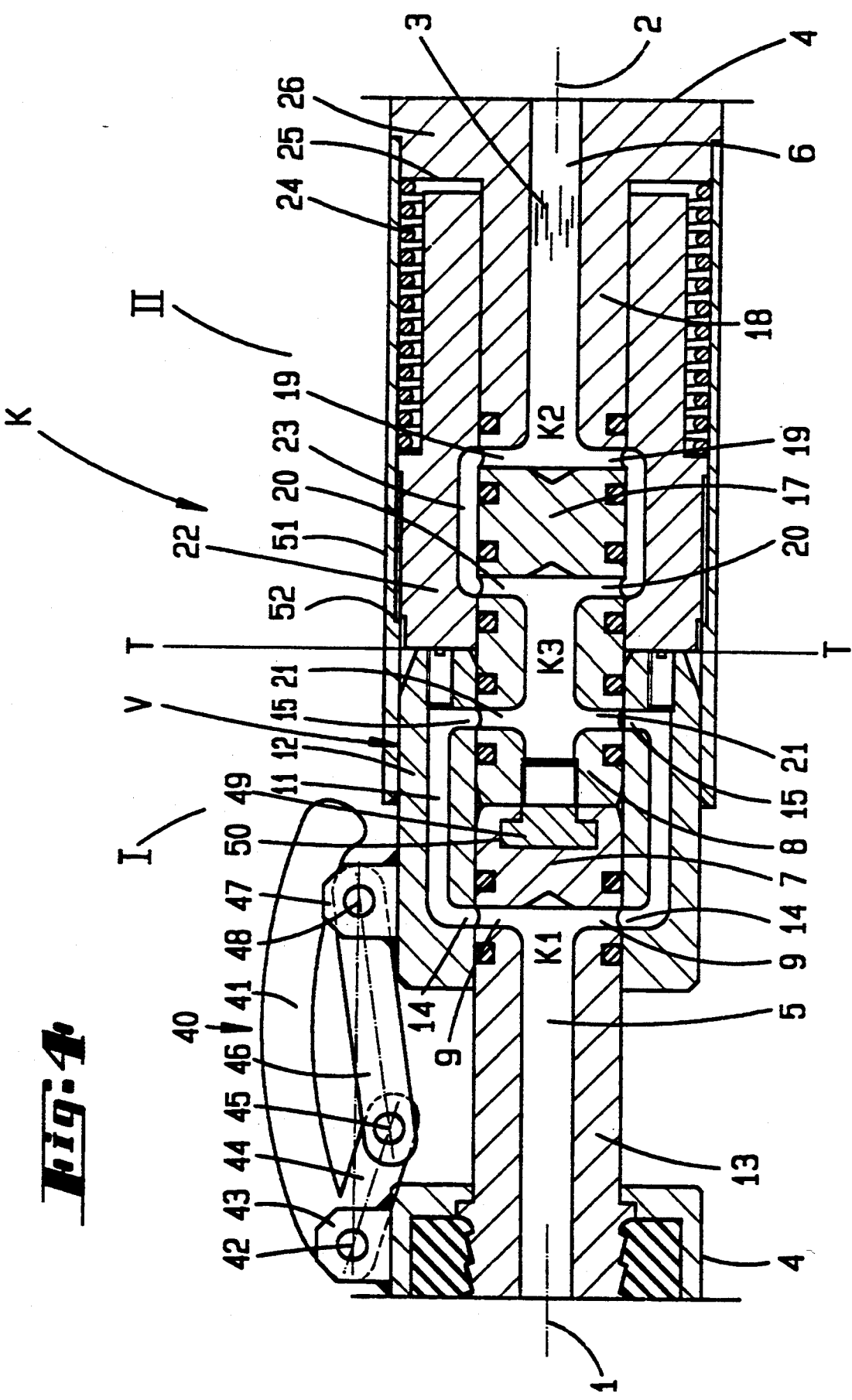
FIG. 4 shows this coupling with flow path released, showing, in this case, a toggle-joint locking means, with hammer-head attachment.

In this position (FIG. 4), the toggle lever formed from the swivel arm 44 and the pull strap 46 is bent beyond a horizontal dead-center line x—x of the corresponding pins 42, 48. The beyond-dead-center-securing position is shown in FIG. 4 in somewhat exaggerated fashion for reasons of better understanding. The load of the hand lever 41 acts to maintain the beyond-dead-center-securing position.

Another structural detail of this embodiment consists in a sort of docking position between the front end of the coupling shank 13 of the coupling part 1 and that of the coupling shank 18 of the coupling part II. As can be clearly noted from the drawings, a sort of hammer head 49 is present as plug on the said front surface of the coupling part II. The hammer head 49 passes in keyhole-like engagement into a cavity of corresponding shape, produced in the front surface of the coupling part I. This connection can be obtained only by transverse insertion. In this radially oriented direction, the recess 50, which is adapted to the contour of the hammer head could be closed on one side so that a sort of pocket is present which secures the centrally or coaxially oriented alignment of the two coupling parts I, II.

A sleeve-like outer housing wall 51 which is directed protruding from the housing section 26 of the coupling part II in the direction towards the coupling part I is used for the inside guidance of the inward-moving box 12. Transverse forces are therefore not able to impair the coupling/opening position shown in FIG. 4. A corresponding guide task is assumed also by a housing outer surface 51 provided in the first embodiment, FIGS. 1, 2, which, in combination with the spring-loaded slide sleeve 22, is also used in the manner of a stop limitation 52.

The introduction-side edge of the box 12 is beveled. A packing (not shown in detail) can be provided between the front end of the box 12 and that of the slide sleeve 22 .

Figure 5:
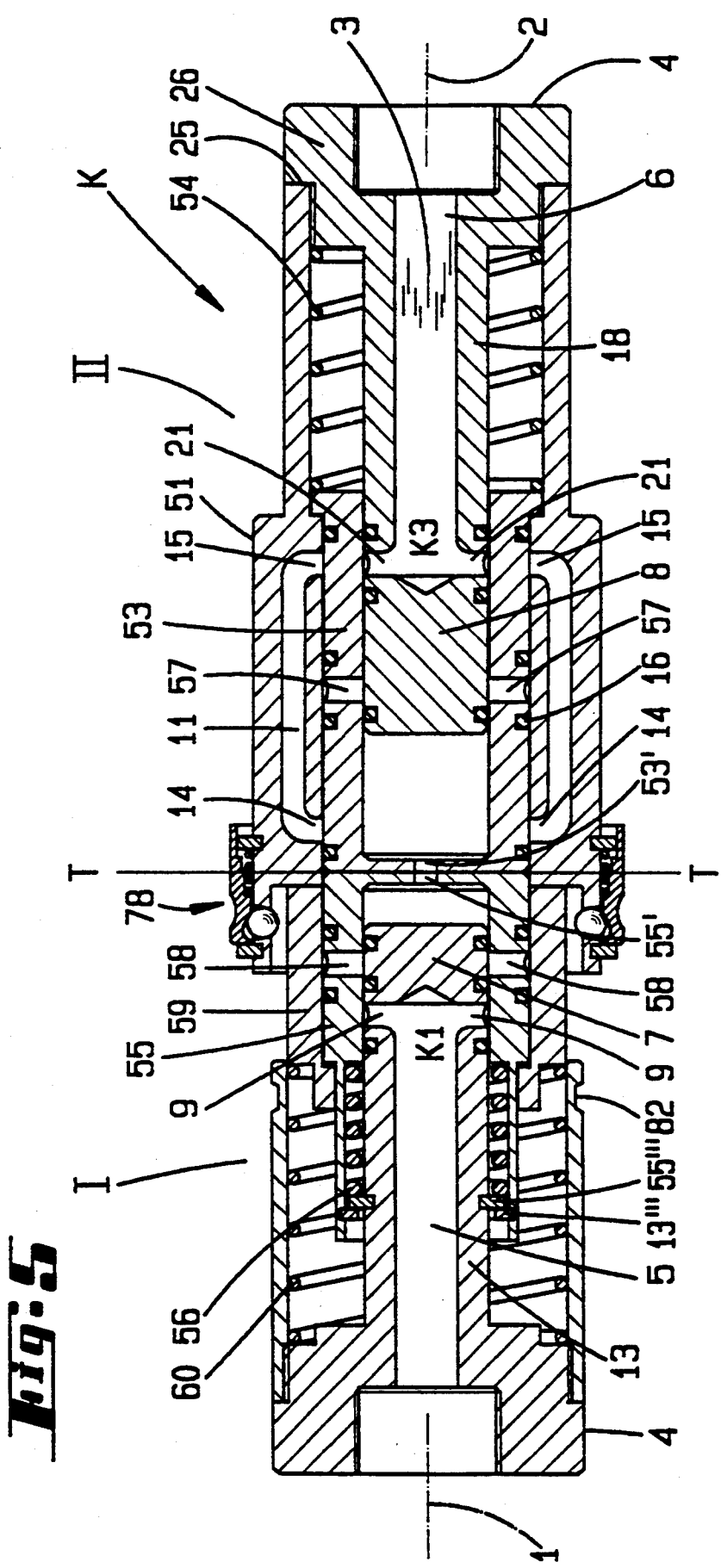
FIG. 5 shows the coupling in accordance with a third embodiment, seen in closed position.

The third embodiment (FIGS. 5 to 7) differs essentially from the solutions described above in the manner that, in it, the conduit section 11 is not arranged in an axially movable part but in a fixed part of the coupling, namely in the housing outer wall 51 there. For the displacement, a slide sleeve 53 arranged on the inside is provided. It is acted on by a compression spring 54 which urges the slide sleeve 53, which is axially displaceable on the cylindrical coupling shank 18 and seals off towards the outside, in the direction of its basic closed position. Said slide sleeve 53 serves for the pushing-off of the right-hand conduit section 18. In the pushed-off position, the radial conduit section 21 which is adjacent the wall 8 comes, valve closed, against the inside of the slide sleeve 53, while the two radial conduit sections 14, 15 extending in opposite direction lie with their mouth cross sections sealed from the outside in front of the outer wall of the slide sleeve 53. The chamber K3 present there is therefore blocked. The volume of fluid separated in the conduit section 11 is therefore, here also, enclosed free of loss.

In this connection, the arrangement is such that the stop limitation is formed by an annular shoulder 55''' arranged on the inner wall of the slide sleeve 55. In the embodiment shown, this is a ring which lies in an annular groove provided on the inner wall of the slide sleeve 55. This annular shoulder 55''' rests, in the basic position shown in FIG. 5, against a stop shoulder 13''' which is provided on the outer wall of the coupling shank 13 and is also developed as a ring lying within an annular groove. The stop shoulder 13''' furthermore forms the support for the compression spring 56 on the side facing away from the annular shoulder 55'''.

The same applies with respect to the left-hand coupling part I. There, also, an axially displaceable slide sleeve 53 is present. Its inner wall covers the mouth cross section of the radial conduit section of the chamber K1. The corresponding slide sleeve 55 is also under the action of a compression spring 56 which urges the slide sleeve in the direction towards its stop-limited basic position.

Only by the axial coupling of the coupling parts I, II are the two slide sleeves 53, 55, which are arranged coaxially in this embodiment, shifted or raised from the blocking position explained. There is then produced the open position of the coupling K shown in FIG. 6, in which the gap between the flow channels 5 and 6 is bridged over, i.e. closed, by the shifting of the conduit section 11 into the fluid flow paths. In this position, namely, a radially oriented connection channel 57 of the slide sleeve 53 and a connection channel of the slide sleeve 55 have namely entered into congruent alignment with the radial conduit sections 14, 15 concerned. The path is free. The aforementioned sealing rings 16 are also present on the side of the connecting channels 57, 58 which are developed in the form of transverse bores.

The locking slides 53 and 55 are closed at their end, except for a central hole 53′ 55′. Via such holes, the air enclosed by the end of the coupling shank 13 or 18 which acts as a piston, can escape. The housing outer wall permits a corresponding path of escape. A corresponding advantage in use results also for the spring-induced outward displacement of the slide sleeve 53.

As shown in the drawing, the slide sleeve 55 is furthermore extended over peripherally by a cover slide 59. This slide is also limited by stop and is under the action of a compression spring 60, which acts in the direction of peripheral closing of the connection channel 58, so that the latter cannot become soiled.

Figure 9:
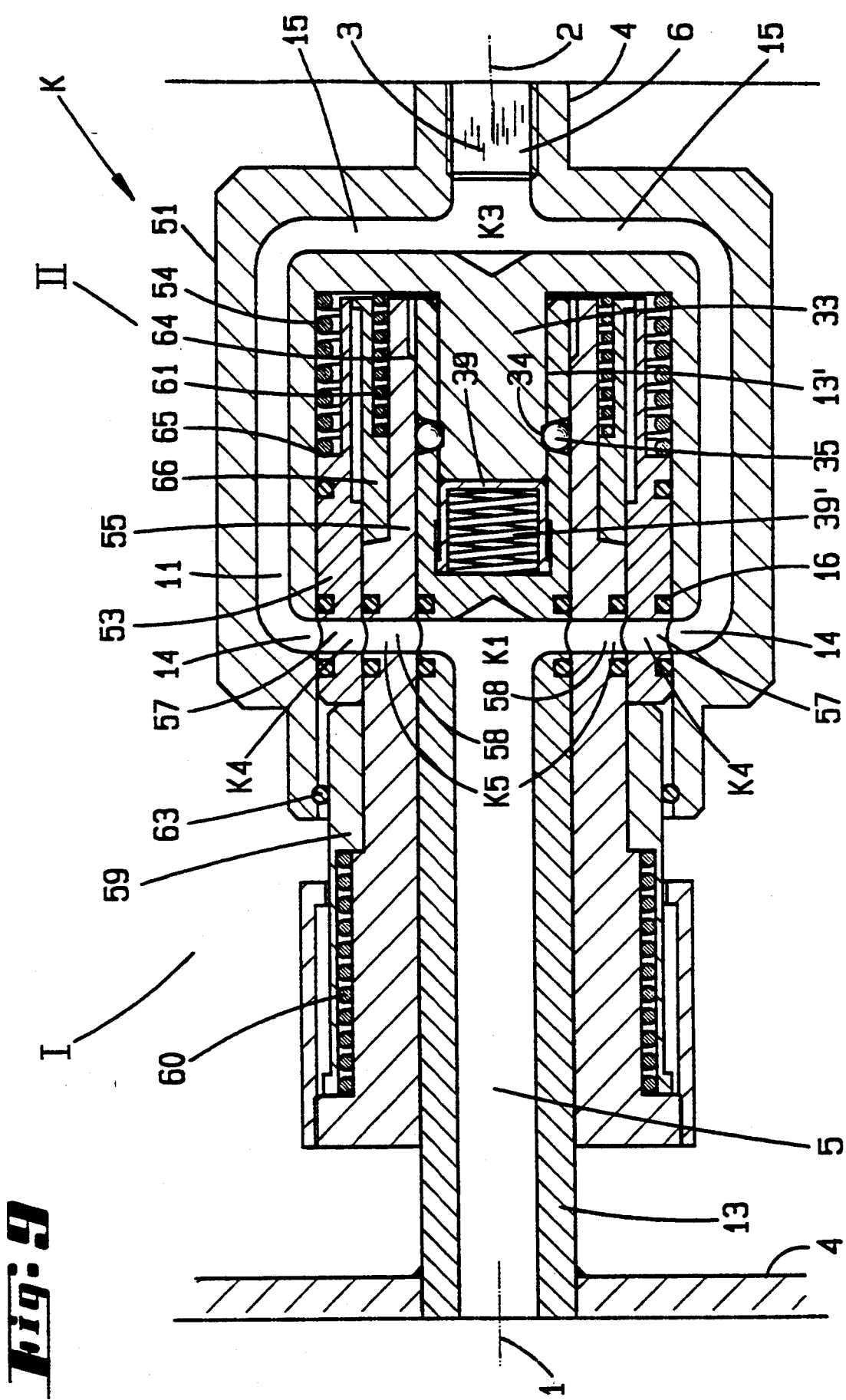
FIG. 9 shows this coupling with flow path released, showing a radially oriented association of the slide sleeves.

The fourth embodiment (FIGS. 8, 9) is, in principle, of the same construction as the third, only that the pushing-off is now effected via slide sleeves 53, 55 which lie radially one above the other. The reference numerals have been in most cases transferred, without details which have already been discussed being repeated. Here, the manners of actuation and locking shown in FIGS. 1, 3 and 5 and explained above can be combined with the differently pushing-off variant solutions. The solution in accordance with FIGS. 8 and 9 results in a particularly short structural form of such couplings. The radially offset bridging conduit section 11 is again contained in a housing outer wall 51 of the right-hand coupling part 2. Its connector-side radial conduit section 14 is connected, unshifted, to the flow channel 6. The radial conduit section 14 facing the left-hand coupling part I again lies in front of the above-described slide sleeve 53 with connection channel 57, which can be designated as chamber K4. This chamber K4, which again receives the separated volume, contains, in accordance with the small wall thickness of this slide sleeve 53, only a fraction of the fluid separated in the first two embodiments in the conduit section 11. The connection channel 58 acts accordingly. It also receives in a chamber K5 a small part of the volume of the fluid which, however, is also held dependably therein in the manner that the corresponding slide sleeve which lies further inward and travels over the outer wall of the coupling shank 13 lies with its inner mouth cross section on said outer wall, and the outwardly-directed mouth cross section, if it is not in congruent alignment with the connection channel 57, is covered by the cover slide 59 which acts as a seal and which, in its turn, is under the action of a compression spring 6.

The two slide sleeves 53, 55 which are partially inserted into each other are contained in an annular shank 62. The shank opens in the direction towards the left-hand coupling part I. The stop limitation of the outer locking sleeve 53 takes place on a snap ring 63 which is arranged at the end side in the inner mouth of the housing wall 51. The stop limiting and locking of the coupling part II with respect to the left-hand coupling part I is again effected via a locking device having blocking balls 35, such as was mentioned in detail in connection with the first embodiment. The corresponding detent pin 33 extends, lying in the center, from the bottom of the said annular shank 62 and has a detent groove 34 at its end. The other reference numerals have been applied in corresponding manner, without repetitions in the text. The stop shoulder on the slide-sleeve side is arranged at the end of a milling which is open on the right side and is designated 64. The compression spring which acts on the outer locking sleeve 53 is designated 54; it rests against the bottom of the annular shank 62 and, at its other end, acts against a peripheral step 65 on the said slide sleeve 53. The spring loading of the slide sleeve 55 is effected indirectly with the interposition of a sleeve part 66. This compression spring bears the reference numeral 61 and rests against the abutment bearing the same reference numeral.

When the coupling is completely separated, very small amounts are separated out in the chambers K4 and K5, carefully sealed off by the customary packing rings 16.

Figure 10:
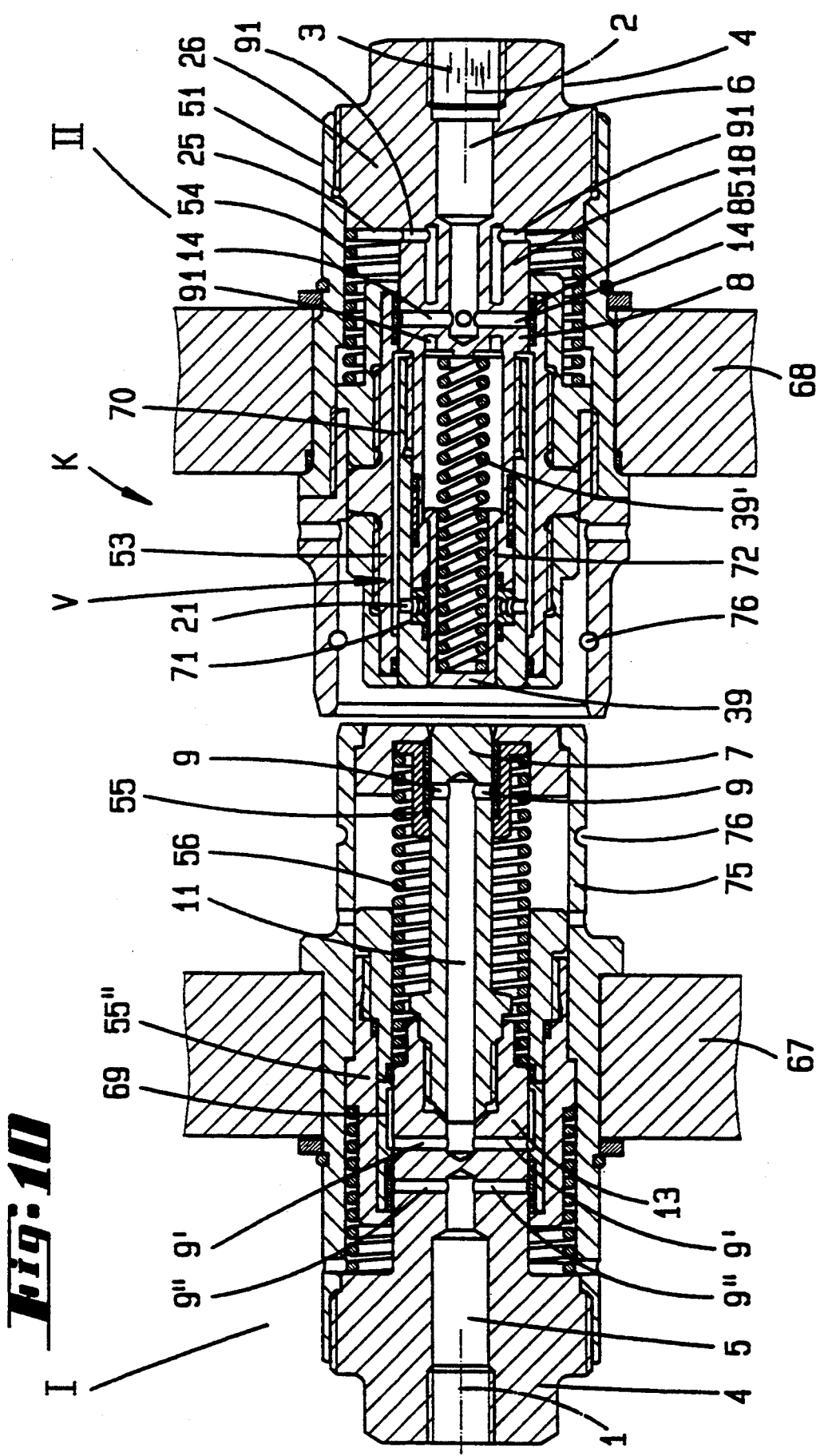
FIG. 10 shows the coupling according to a fifth embodiment, seen in closed position, uncoupled; shows this coupling in coupling position with flow
Figure 11:
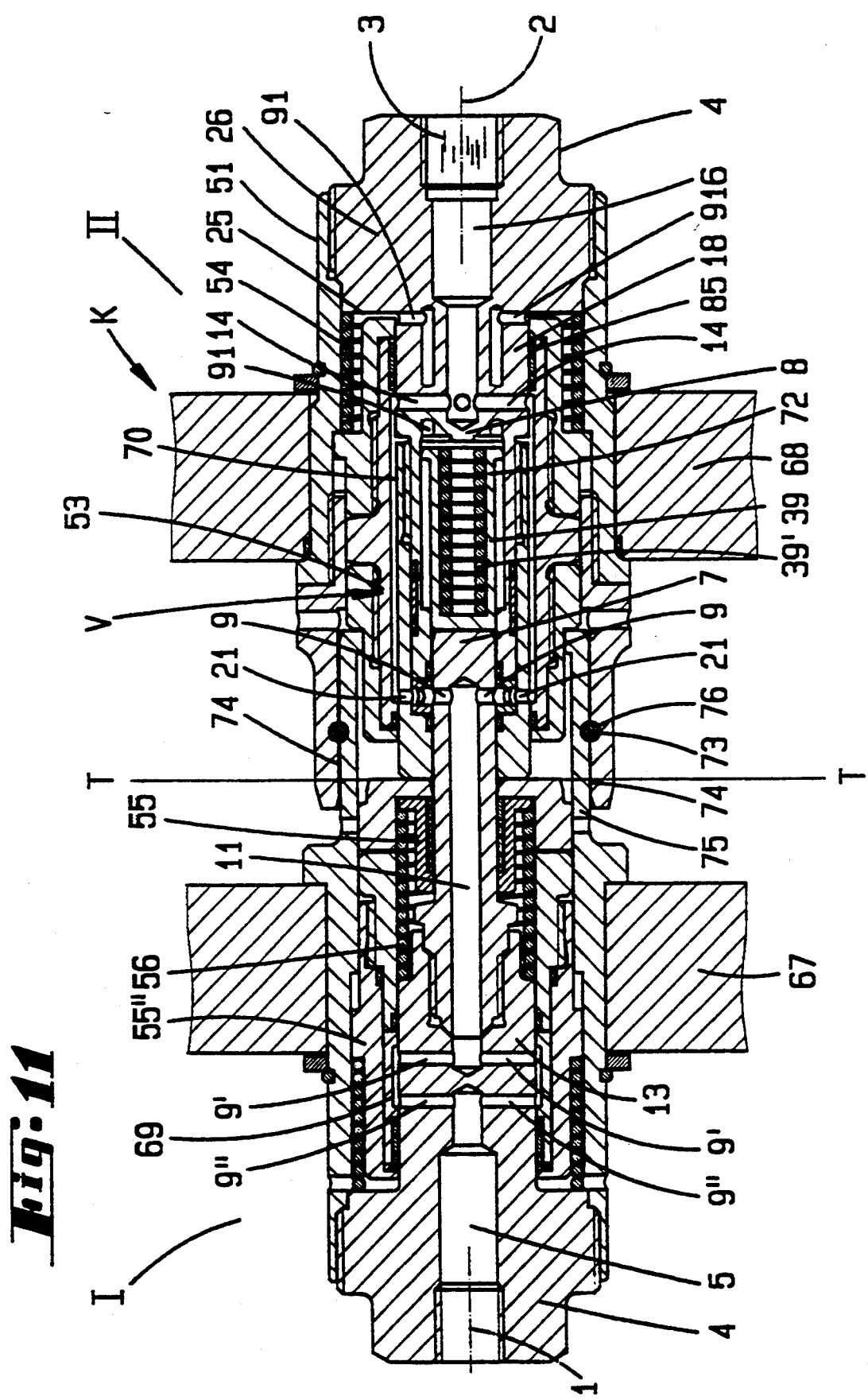
FIG. 11 shows this coupling in coupling position with flow path released, the coupling parts being associated with a fixed half and a loose half of a device developed, for instance, as multicoupling.

The coupling K in accordance with the fifth embodiment (FIGS. 10, 11) has, in principle, the same solution in connection with a multicoupling. The one, left-hand coupling part I of the couplings K provided in multiple arrangement is located in a fixed plate 67, while the other coupling part II is located in a loose plate 68 which, spaced by means not shown in detail, for instance a displacement cylinder, effects the combining of the coupling parts I, II shown in FIG. 11. In this position, the fluid flow path is free. In the open position of this coupling K, the fluid flow path is again blocked via a pushing-off, the said slide sleeves 53, 55 being under the action of compression springs 54 and 56 respectively. In the left-hand coupling part I, the partial volume of the fluid is isolated in a conduit section 11 having two sections, which is now in central position. Its radial conduit cross sections 9 which face the parting plane T—T are blocked off by the slide sleeve 55. Radial conduit section 9′ which are furthermore formed in the corresponding coupling shank 13 provide the flow connection to the central flow channel 5. The mouth cross sections of these radial conduit sections 9′ can enter into communication with a circumferential annular channel 69. The annular channel 69 is so long axially that the radial conduit sections 9′ can be connected with other radial conduit section 9″ for which there is required the axial displacement of an additional slide sleeve 55″ against spring load. The further conduit section 9″ are in communication directly with the central flow channel 5. Their pushing-off can be noted from FIG. 10. The right-hand coupling part II also isolates a part of the volume within an annular channel 70 between the central coupling shank 18 which is present there and the spring-loaded slide sleeve 53.

On the shank side, this connection again takes place via radial conduit sections 14 in the shank 18. In the vicinity of the partition 8 there are then radial conduit sections 21, the radially inwardly directed mouth cross sections of which face a circular ring 71. Its inwardly directed mouth sections close off a slide 72 which is under spring load. As soon as this slide 72 has moved to the right against spring load in coupled state and the nipple-like section of the coupling shank 13 has entered into a corresponding central bore of the other shank 18, the desired flow connection between conduit section 21 and the above-mentioned radial conduit section 9 of the nipple-like part is present, defined by stop.

The coupling K can be secured by parallel-extending shanks of a cotter 73, the shanks passing through the coupling joint 74 between housing-wall 51 and a housing wall 75 of the left-hand coupling part I. This portion has a paired insertion channel 76 formed proportionately by the two structural parts.

Further details are self-explanatory on basis of the drawing. This applies for instance to air-escape paths, holding rings, packing, etc. which have been taken into account.

Figure 12:
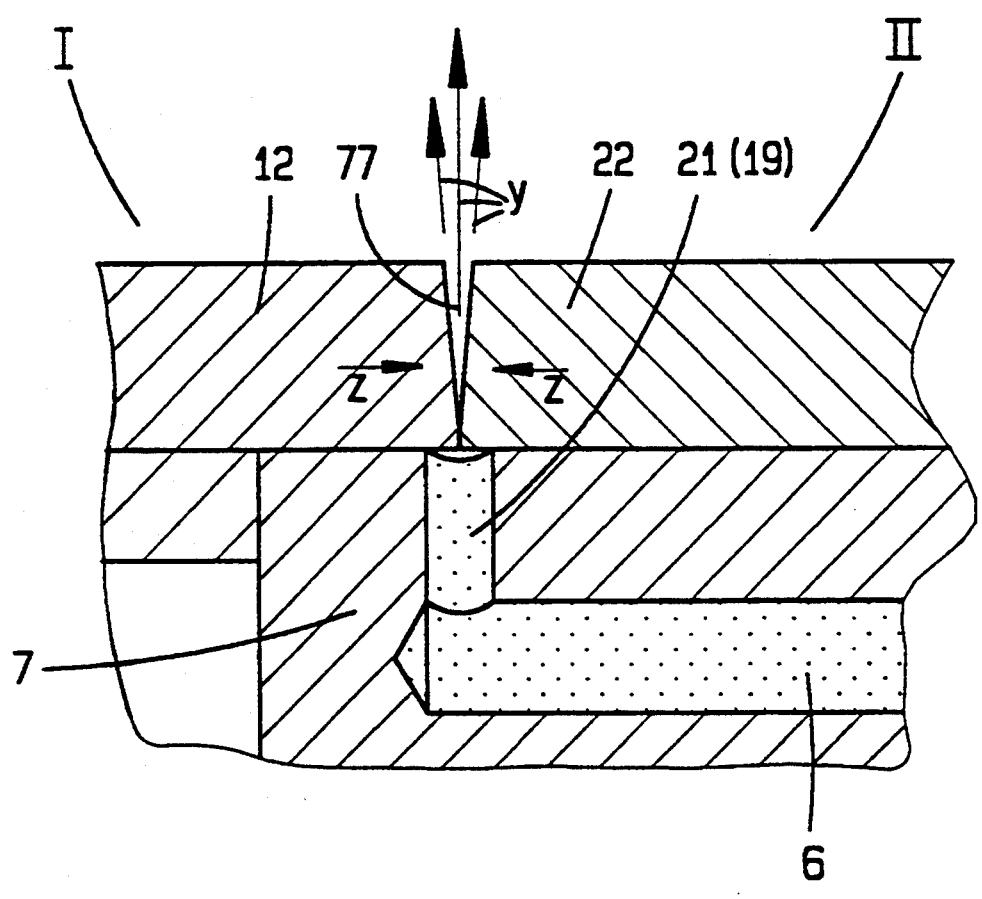
FIG. 12 is an enlarged view of the zone of the coupling producing a Venturi effect.
Figure 14:
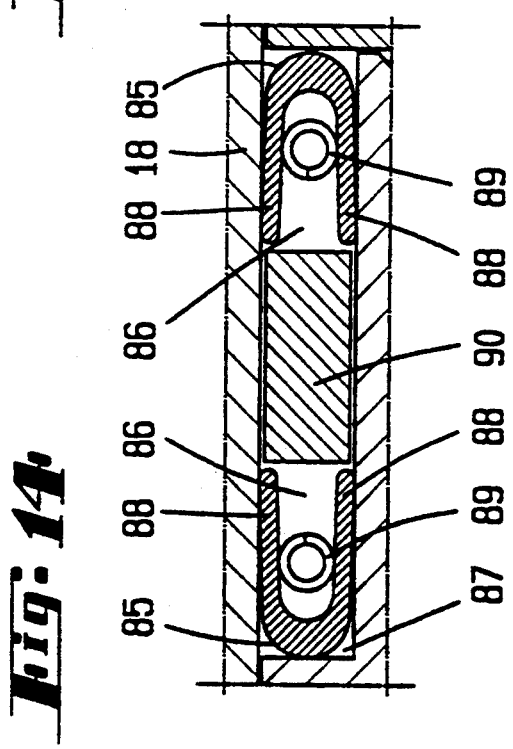
FIG. 14 is another further enlarged view of this sealing region.
Figure 13:
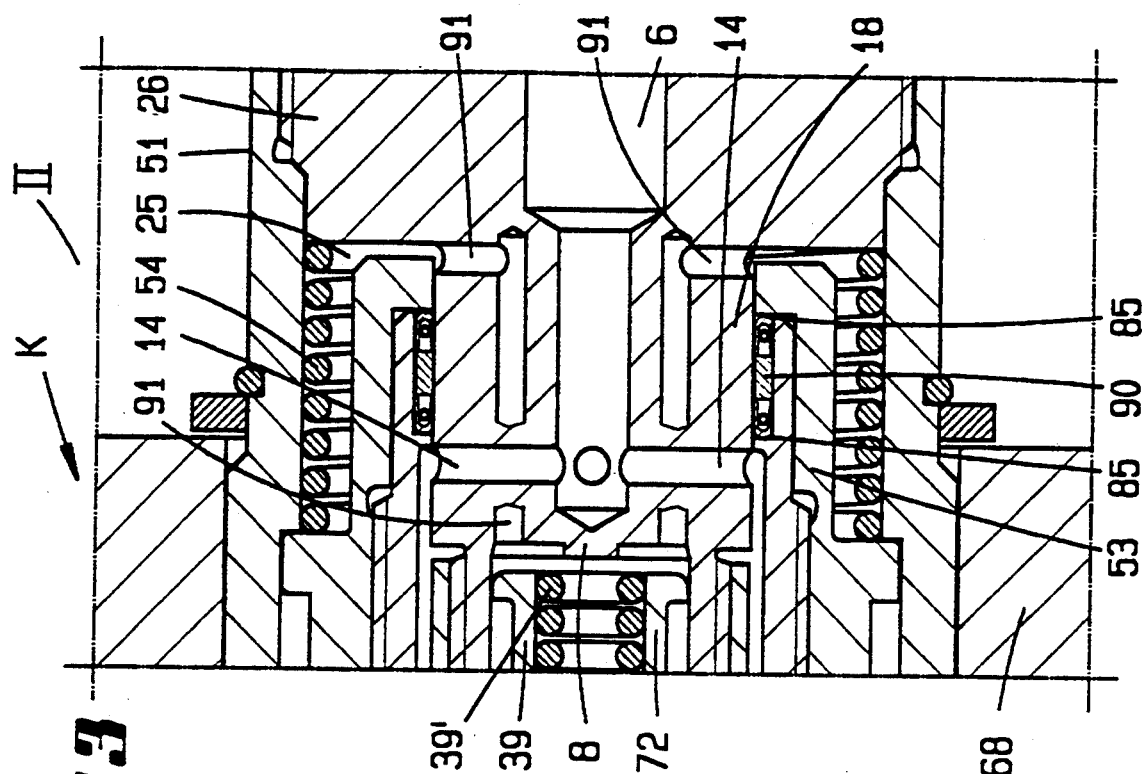
FIG. 13 is an enlarged view of the right-hand portion of the coupling part II in accordance with the fifth embodiment, with particular emphasis on sealing elements there.

With reference to FIG. 12, it should also be mentioned that the end surfaces of box 12 and locking sleeve 22 of the two coupling parts I, II which surfaces lie against each other in coupled state are developed to produce a Venturi effect. For this purpose, the gap between box 12 and/or slide sleeve 22 widens towards the outside. In this way, there is produced a partial space 77 of about 10° which widens continuously proportionally to the outer wall of said parts. Towards the inner wall of the box 12 and slide sleeve 22, the said end surfaces are still in contact with each other. Upon movement thereover of conduit section 19 which is, for instance, under operating pressure, which would be possible in a simplified construction without chamber K3, a portion of the fluid which forces its way through the gap between the two slide parts (see arrow y) would effect the pulling together of box 12 and slide sleeve 22. The oppositely directed movement of attraction of the end surfaces is designated by the arrows z. Such a coupling, however, finds use only in the case of fluids which are environmentally unobjectionable.

The third embodiment provides a slide-sleeve locking device 78 for the securing of the two coupling parts I, II to each other. Their slide sleeve 79, which is displaceable axially out of the housing wall 51, has an escape space 80 on the inner side. Having passed into it, blocking balls 81 leave a circumferentially continuous detent groove on the outer wall side in the outer surface of the housing outer wall 51 of the coupling part I. The compression spring which urges the slide sleeve in the direction of action is designated 83.

This embodiment also permits the desired single-hand one-hand operation K.

Instead of the holes 53' 55', outwardly extending branch channels 84 can displace the air in front of the nipple outward and generally avoid a piston action.

With regard to the coupling in accordance with the fifth embodiment, reference should furthermore be had to a special nature of the seal which is located between the coupling shank 18 and the slide sleeve 53 moving in guided fashion over it. The corresponding sealing zone is realized at the foot of the shank 18. There are concerned sealing elements 85 arranged in pairs. They are metal profiled rings of U-shape in cross section. Their U-openings 86 face each other. Upon the described axial displacement of the slide sleeve 53, the radial conduit section 14 passes into the receiving space 87, open on the gap side of the parts 18 and 53 of the slide sleeve 53 which receives the sealing elements 85 in a row. The receiving space 87 passes in this connection under pressure of the fluid via flow channel 6. The U-arms 88 of the sealing elements 85 are thereby finally pressed firmly against the corresponding wall sections of the receiving space 87. The U-arms 88 diverge slightly in the direction of the opening 86. They can also have a certain pretension. Furthermore, they have, in the inside of the gap U, a support body 89 which correspondingly acts on the U-arms 88. This may be a coil compression spring which is clamped in position and the turns of which overlap under radial pressure. The sealing elements 85 can be moved over by pressure means from the web, the U-arms 88 being compressed, lifting from the sealing surface. Other functional conditions can thus be created by turning.

The sealing elements 85 are spaced apart axially. For the securing in position of them within the receiving space 87, a spacer 90 which can be flown over is present therein. It consists of a ring. The ring terminates in front of the openings 86.

The sealing elements 85 described are furthermore arranged, in this form and action, also between the coupling shank 13 of the one coupling part I and the further annular slide 55', in that case in cooperation with the further radial conduit section 9'. Such a pair of sealing elements 85 is also provided for the conduit section 9 in connection with the slide sleeve 55.

The inner space guiding the adjuster 39 and the annular space receiving the compression spring 84 in which the slide sleeve 53 also moves, changing the volume, are in communication via a common vent conduit 91.

The variants of the second embodiment which are shown in FIGS. 15 to 18 will now be explained: Identical parts bear the corresponding reference numerals. In order to avoid repetitions, only the elements which have been changed will be described. They are a spherical detent 34/35/38. The detent engagement is present with the toggle lever locking device 40 in the bent position and therefore with the box 12 pulled back. The conduit section 11 is in this connection pushed off. Reference is had to FIG. 17.

Via this spherical detent, the two coupling halves I, II can also be locked to each other, for which purpose the coupling shank 18 again has a central detent pin 33 with circumferential detent groove 34 near the end.

In order to receive the blocking balls 35, the coupling shank 13 of the one coupling part I is correspondingly lengthened forming a ball cage. The detent balls are forced into the groove-like escape space 38 from the receiving bore 13' for the detent pin 33, which bore grips the cylindrical shank, the said displacement space permitting also in this case the entrance in locking manner of the blocking balls 35.

Figure 15:
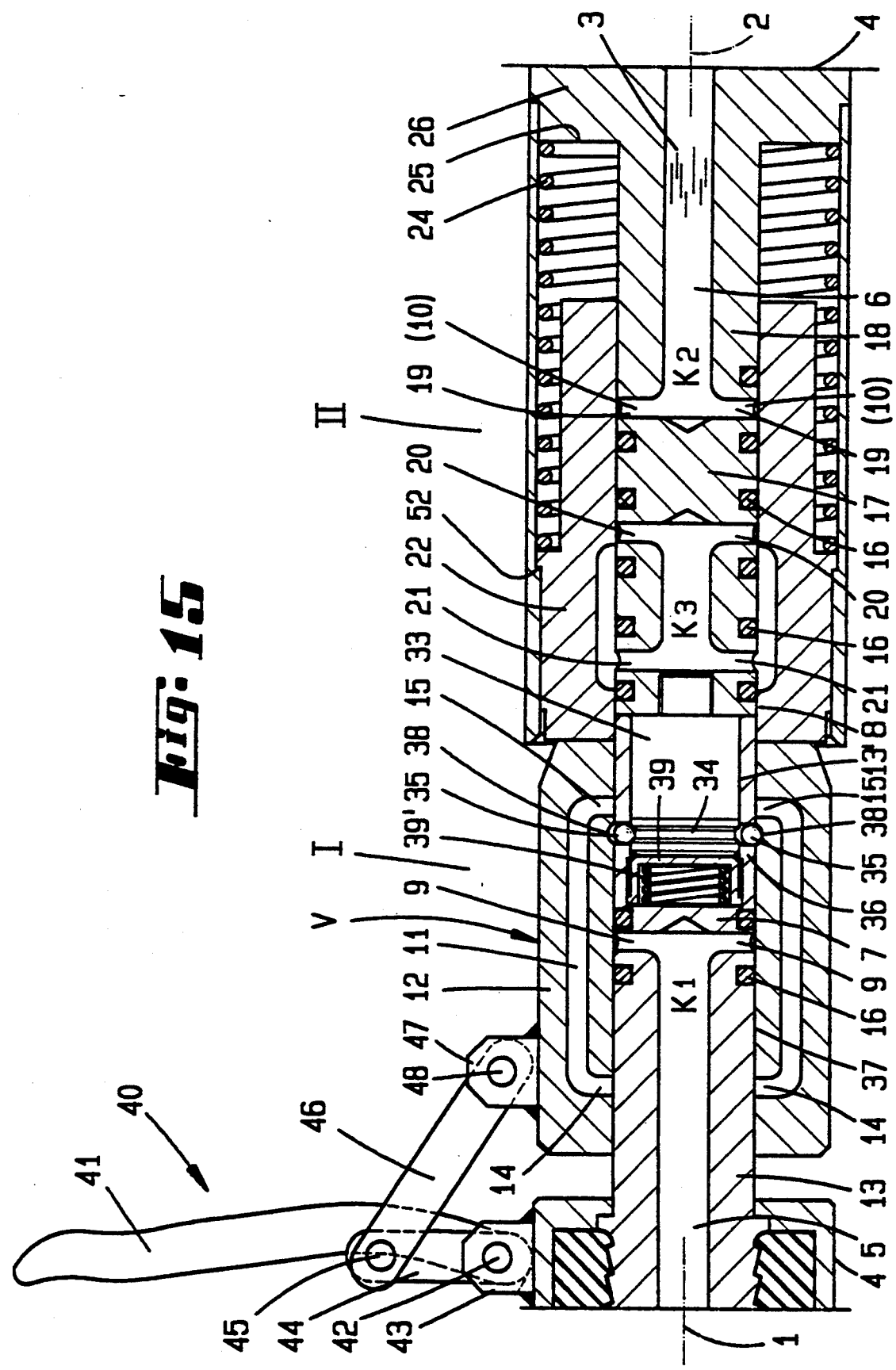
FIG. 15 shows a variant of the coupling of the second embodiment in closed position, a ball detent being furthermore provided in addition to the toggle-joint locking device.
Figure 16:
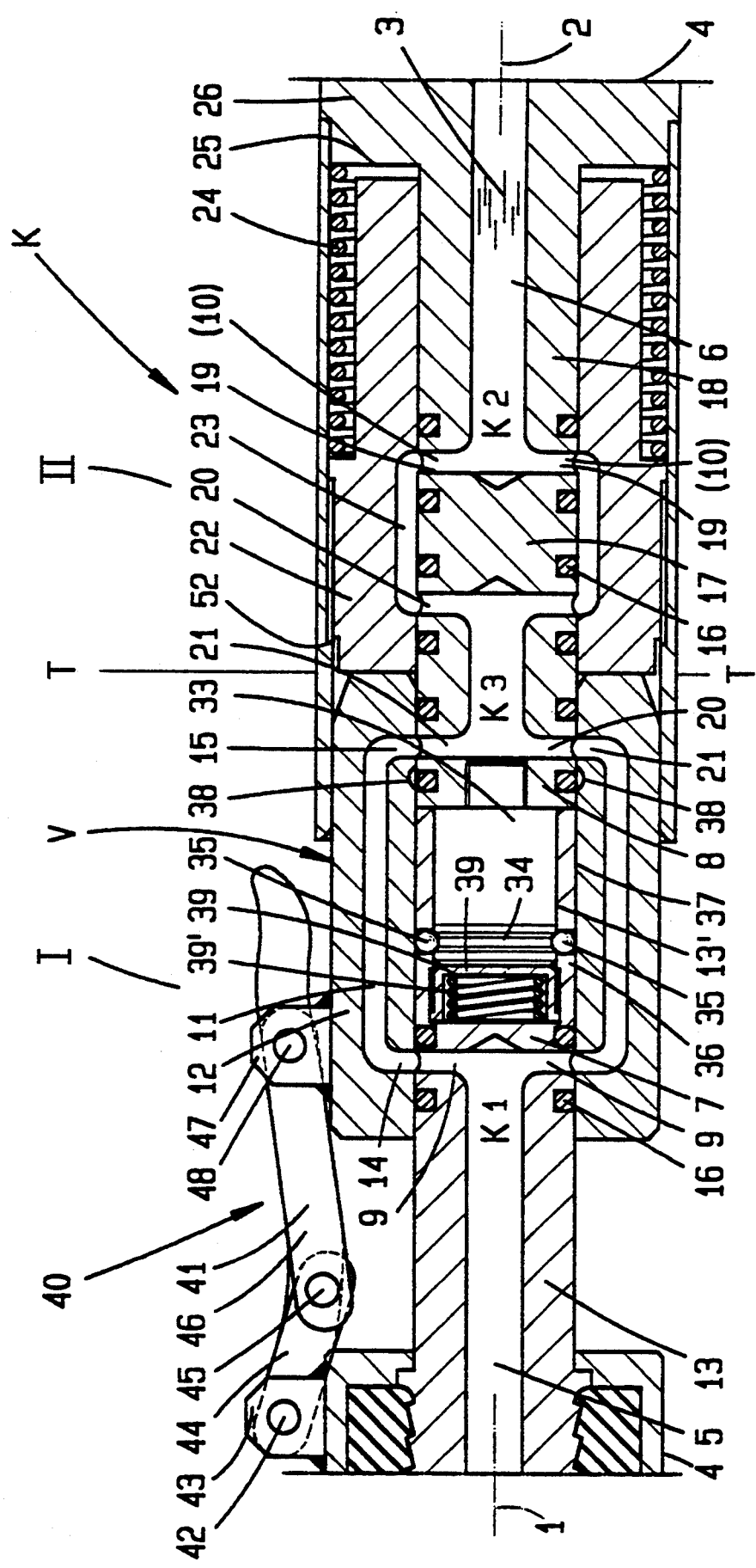
FIG. 16 shows this coupling with the flow path released.

In FIG. 15, the position of readiness for engagement is shown. Blocking balls 35 and detent material 34 are in a common transverse plane. If the hand lever 41 is now turned in clockwise direction, the closure part V and the box 12 are shifted; the escape space 38 is displaced. In hand with this, the box 12 pushes the slide sleeve 22 of the other coupling part II against the action of the spring 24, there finally being produced the open position of the coupling K shown in FIG. 16, in which position the fluid 3 can flow.

The spherical detent 34/35/38 can in this connection again be eliminated with the pulling-out of the hand lever 41. The position shown in FIG. 15 is reached. This position can be limited by stop. The blocking balls 35 and escape space 38 coincide. The path is free for the separation. The flow path is blocked. The coupling part II can now be pulled off. The emerging detent pin 33 permits the spring-loaded pushing of the cup-shaped ejector 39. The latter moves under the blocking balls 35 which now rest on the cylindrical outer wall of the ejector 39 and are thus held in engagement with the escape space 38. The box 12 is fixed in position. The ejector 39 has an outwardly directed edge at the end thereof facing the wall 7, which edge cooperates with a stop-limiting step on the cage 36 which lies in the opposite direction. The step is so designed that a sufficient axial stroke is provided for the ejector 39, the stroke being sufficient to move under the blocking balls 35. This is true also of the first embodiment.

In the opposite direction of pull, the flat end of the detent pin 35 effects the moving back of the correspondingly flat end side of the ejector 39, so that the position shown in FIG. 15 is again reached.

With regard to the sixth embodiment, the difference in development consists therein that the means on the coupling part I and reversed in that now the stationary housing wall 75 forms the isolatable conduit section 11, with structural simplification of the coupling K in accordance with the fifth embodiment, in the bypass path of the fluid. The displacement takes place accordingly via an inside member.

The other coupling part II, on the other hand, is constructed in the manner described with respect to the first and second embodiments. The reference numerals have been applied accordingly.

With this coupling part II, there is furthermore associated the slide-sleeve locking device 78 which has been described in detail in the third embodiment. The function is the same. The reference numerals have been applied here without further explanation.

The outer bypass paths in the stationary housing wall 75 contain, in conduit sections 11, the portions of fluid which can be isolated by displacement. The inner slide which is displaceable with respect hereto is designated 92. The housing wall 75 which, in uncoupled state, thus contains a separated volume, also has a second, axially following outer bypass path which is also slide controlled at one end but is in fluid communication in the direction of the fluid conduit 1. This bypass path is designated 93 and consists of channels surrounding the cylindrical receiving bore 37 for the inner slide 92. The channels terminate on the side facing the fluid conduit 1 at a central meeting point 94 into which the central flow channel 5 debouches. The receiving bore 37 terminates at a sufficient distance in front of the meeting point 94. From there, conduit sections 45 rise radially directed along a cone outer surface in the direction of the other coupling part II in order to pass over smoothly arched sections into the channel-like bypass path 93. The end of the bypass path 93 which lies in this direction also extends over an arched section in the direction towards the receiving bore 37. The inner radial conduit section of the bypass path 93 is designated by the reference numeral 96.

Figure 19:
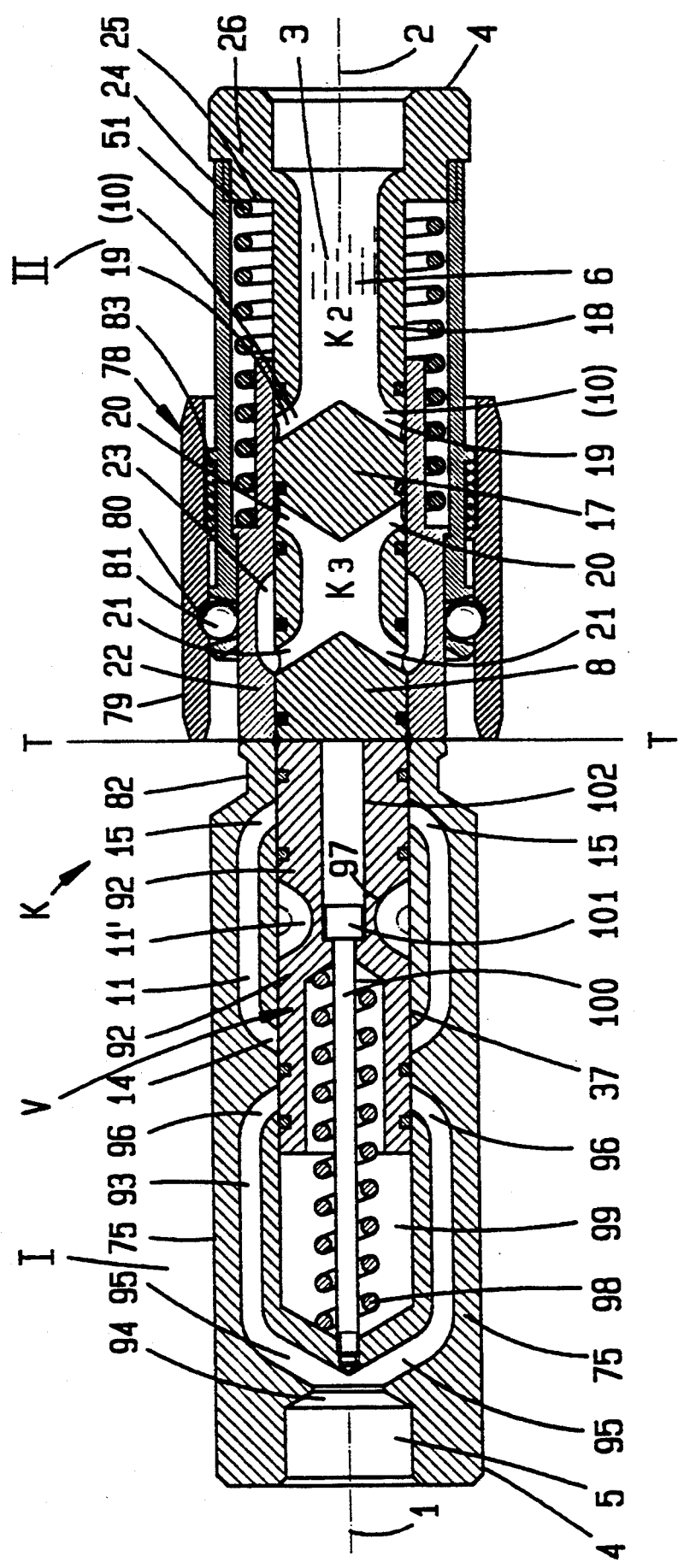
FIG. 19 shows the coupling in accordance with a sixth embodiment, in position ready for closing, uncoupled.

The inner-slide-side conduit bridge 97 has the appearance of for instance a wasp-waist rounded construction, as shown in FIG. 19. Instead of such a rounded groove of rotational symmetry, there can also be concerned channels the mouths of which can be brought to coincide with the mouths of the bypass paths 93 or conduit sections 11. For this, as shown in dash-dot line in FIG. 19, a peripheral zone of material would remain. In the closed position of the coupling K, the partial volume separated off in the conduit bridge 97 is pushed away. Therefore, in this case also, the function of the conduit section 11 is obtained, even in a movable part. The bridge-forming conduit section is designated 11'.

The axial length of the conduit bridge 97 takes into consideration the axial distance between the radial conduit section 14 and the radial conduit section 96. The bridging which permits through flow can be noted from FIG. 20. As can be seen from said figure, the fluid 3 there assumes a smooth course of flow, passing the joint between the inner members and the outer ones. The conduit sections 21, 20 and 19 of the coupling shank 18 are also aligned along a cone outer surface in line with the desired overall wave-shaped course in the region of the chambers K2 and K3. In addition to a flow of less resistance, there is furthermore obtained a high quality mixing, for which reason this coupling K is suitable for inoculation with another substance at the start of the flow.

The same purpose is also served by the embodiment shown in FIG. 21, explained on basis of the coupling of the first embodiment, in which connection, however, with regard to the conduit section 23 in the other coupling part II, no annular channel in the form of a milling is provided as bypass path, but rather axially oriented channels. In that case, the bypass paths of the first and second coupling parts I, II are connected by at least two conduits 20/21 which intersect each other. These conduits change, intersecting each other, from one side of the cylindrical outer wall to the other and are therefore with offset intersection in the manner of tilted mikado bars in such a manner that the flow paths do not pass through each other. The full cross section of the extended bores is therefore fully retained, also in the region of intersection. Their mouth ends come into coupling connection opposite the mouth ends of the adjoining conduit sections 11 and conduit sections 23 respectively.

On the other hand, if congruent transfer from mouth ends, which structurally requires a securing against turning of the guided parts, is not desired, there is then advantageous a solution in the manner that, within the mouth region of the conduits 20/21, annular grooves (not shown) are formed on the outer wall side of the coupling shank 18, these grooves connecting all mouth regions of a transverse plane with each other. The mouth regions terminate clearly spaced apart axially in one transverse plane each. The distance apart is so selected as to result substantially in an oblique course of the conduits 20/21 which is at an angle of 45° to the longitudinal center axis of the coupling K. The flow-free course of the conduits 20/21 can be noted particularly clearly from FIG. 23.

It remains to be pointed that the inner slide 92 is urged by a central compression spring 98 out of the stop-limited closed position into the coupling position which frees the path of flow. The compression spring finds its abutment on the bottom of the receiving bore 37 of the stationary housing wall 75 and extends into a milling in the inner slide 72 which cooperates in forming the corresponding spring chamber 99. The bottom of the milling forms the acting surface for the compression spring 98. The inner slide 92, which is displaceable by the coupling shank 18 against the force of the compression spring 98, is held, limited by stop, by a guide rod 100 the lower edge of the head 101 of which strikes against an annular shoulder on the inner slide 92. The guide rod 100 is fastened centrally to the bottom of the receiving bore 37, being preferably screwed to it. The head 101 lies in a guide section 102 of the inner slide 92, which is located so far back from the right-hand end that, in the coupled state (FIG. 20), the bridge position is reached and the end surface of the wall 8 stops in front of the head 101. Said head 101 can even act in this respect as adjustment means.

We claim:

1. A connection coupling for connecting a first and a second fluid conducting conduit, comprising:

a first coupling part, and a second coupling part abutting the first coupling part during operation of said coupling, at least one of said coupling parts having a closure element and a cylindrical body displacable within the closure element;

wherein each of said closure element and said cylindrical body has a transverse conduit extending transversely of a central longitudinal axis of the coupling and terminating in a mouth;

said mouths of the transverse conduits of said closure element and said body are brought into coincidence upon a relative displacement between said closure element and said body to enable a conduction of fluid in said transverse conduits between said closure element and said body in an open position of the coupling;

displacement between said closure element and said body serves also to effect a valve closure within said at least one coupling part upon an offsetting of said mouths of the transverse conduits of said closure element and said body;

said closure element has a longitudinally directed conduit connecting with said transverse conduit of said closure element and being a part of a fluid flow path through the coupling in the open position of the coupling, said transverse conduit and said longitudinal conduit of said closure element constituting a conduit section of said at least one coupling part; and upon a closing of the coupling by said displacement, said conduit section is isolated with enclosure of any fluid present within the conduit section.

2. A coupling according to claim 1, wherein
said first and said second coupling parts have respectively a first central passage and a second central passage communicating with respectively said first and said second fluid conducting conduits; and
in an open position of the coupling, said conduit section extends radially of said longitudinal axis to communicate with said first and said second central passage of said coupling parts.

3. A coupling according to claim 2, wherein said at least one coupling part includes a chamber disposed in said fluid flow path, said chamber being cut off from said central passage of said at least one coupling part in said closed position of the coupling, said chamber communicating with said central passage of said at least one coupling part in said open position of the coupling.

4. A coupling according to claim 3, wherein, in the open position of the coupling, said conduit section connects said chamber of one of the coupling parts with said central passage of the other of the coupling parts.

5. A coupling according to claim 3, wherein, in said at least one coupling part, said closure element comprises a slide sleeve enclosing said longitudinal conduit, said transverse conduit and a further transverse conduit communicating with said longitudinal conduit for connecting said chamber to said central passage in said open position of the coupling.

6. A coupling according to claim 1, wherein
there is a parting plane between said first and said second parts; and
said closure element is a box which is displaceable beyond the parting plane between said two coupling parts, the conduit section extending over the parting plane in an open position of the coupling.

7. A coupling according to claim 6, further comprising a detent, and wherein said box is axially lockable on one of the fluid conduits by radial detent engagement of said detent.

8. A coupling according to claim 6, further comprising a toggle-joint locking device with an abutment which is fixed axially on one of the fluid conduits, said box being connected by said toggle-joint locking device to said abutment.

9. A coupling according to claim 8, wherein said toggle-joint locking device comprises a hand lever by which said toggle-joint locking device is actuated.

10. A coupling according to claim 8, wherein said toggle-joint locking device is operable to move into a safety position beyond dead center.

11. A coupling according to claim 8, further comprising a ball detent operable with the toggle joint bent, the ball detent acting between said box and said cylindrical body.

12. A coupling according to claim 1, further comprising a hammer head configured as a plug and being disposed on an end surface of one of said first and said second coupling parts for engagement in keyhole fashion in a cavity in an end surface of the other of said first and said second coupling parts.

13. A coupling according to claim 1, wherein
each of said coupling parts has a closure element and a cylindrical body displacable within the closure element, one of said closure elements being a box and the other of said closure elements being a sleeve; and
end surfaces of said box and of said sleeve abut each other in a coupled state of the coupling with an outwardly opening wedge space.

14. A coupling according to claim 1, wherein, a second of said coupling parts has a cylindrical body, the cylindrical bodies comprising two slide sleeves which are displaceable with respect to each other and with respect to said longitudinal conduit and are directed in opposite directions against said fluid conducting conduits.

15. A coupling according to claim 14, wherein
there is an annular shaft between said first coupling part and said second coupling part; and
said slide sleeves are arranged concentrically in said annular shaft between the first coupling part and the second coupling part.

16. A coupling according to claim 15, wherein, in an uncoupled state of the coupling, an isolated volume is present in a transverse conduit of each slide sleeve.

17. A coupling according to claim 14 further comprising a set of sealing elements of U-shaped cross section, and being disposed with their U-openings facing each other, said set of sealing elements serving to seal off one of said sleeves from one of said coupling parts.

18. A coupling according to claim 17, further comprising a spacer member, said two sealing elements being spaced from each other by said spacer member.

19. A coupling according to claim 1, further comprising an end-surface seal disposed between said coupling parts.

20. A coupling according to claim 1, wherein said closure element has an extension conduit directed in longitudinal direction, and said cylindrical body has a further transverse conduit providing fluidic communication between said extension conduit and said longitudinal conduit in a coupled state of said coupling.

21. A coupling according to claim 20, wherein the extension conduit and the longitudinal conduit of said closure element are in communication with one of said fluid conducting conduits connecting with said closure element such that said extension conduit lies between the fluid conducting conduit and the longitudinal conduit, the longitudinal conduit containing a separated volume of fluid in an uncoupled state of the coupling while the extension conduit is in fluid communication with the fluid conducting conduit.

22. A coupling according to claim 20, wherein each of said coupling parts has a closure element, said cylindrical body extending into both of said closure elements during a coupled state of the coupling, said cylindrical body having additional transverse conduits, the transverse conduits of said cylindrical body communicating with the longitudinal conduits of both of said closure elements during the coupled state of the coupling, wherein at least two of the transverse conduits extend through the cylindrical body without being in fluid communication with each other.

23. A coupling according to claim 22, wherein said cylindrical body has circumferential grooves which are developed in regions of mouths of the transverse conduits.

24. A coupling according to claim 1, wherein the longitudinal conduit of said closure element has a first end and a second end, said first end connects with said transverse conduit of said closure element, said closure element includes a second transverse conduit connecting with said second end of said longitudinal conduit of said closure element, said cylindrical body has a second transverse conduit communicating with said second transverse conduit of said closure element during an open position of said coupling; and upon a closing of the coupling by said displacement, said first and said second transverse conduits of said closure element are blocked by said cylindrical body to isolate any fluid present within the conduit section.

* * * * *